(12) United States Patent
Charlton et al.

(10) Patent No.: US 10,878,635 B1
(45) Date of Patent: *Dec. 29, 2020

(54) AUDIO RESPONSIVE AUGMENTED REALITY

(71) Applicant: Snap Inc., Santa Monica, CA (US)

(72) Inventors: Ebony James Charlton, Santa Monica, CA (US); Jokubas Dargis, Santa Monica, CA (US); Michael John Evans, Venice, CA (US); Samuel Edward Hare, Los Angeles, CA (US); Andrew James McPhee, Culver City, CA (US); Robert Cornelius Murphy, Venice, CA (US); Eitan Pilipski, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,273

(22) Filed: Jul. 31, 2019

Related U.S. Application Data

(63) Continuation of application No. 15/666,349, filed on Aug. 1, 2017, now Pat. No. 10,445,936.

(Continued)

(51) Int. Cl.
  *G06T 19/20* (2011.01)
  *G06T 19/00* (2011.01)
  *G06F 3/16* (2006.01)

(52) U.S. Cl.
  CPC .............. *G06T 19/006* (2013.01); *G06F 3/16* (2013.01); *G06T 19/20* (2013.01);
  (Continued)

(58) Field of Classification Search
  CPC .......... G06T 19/006; G06T 19/20; G06F 3/16
  (Continued)

(56) References Cited

U.S. PATENT DOCUMENTS 6,038,295 A 3/2000 Mattes
6,490,359 B1 * 12/2002 Gibson ............... G10H 1/0008
381/119

(Continued)

FOREIGN PATENT DOCUMENTS

CA 2887596 A1 7/2015

OTHER PUBLICATIONS

"U.S. Appl. No. 15/666,349, Non Final Office Action dated Jan. 14, 2019", 24 pgs.

(Continued)

*Primary Examiner* — Jin Ge
(74) *Attorney, Agent, or Firm* — Schwegman Lundberg & Woessner, P.A.

(57) ABSTRACT

Systems and methods for receiving audio data; identifying one or more graphical interface elements that correspond to the audio data; generating a display of the identified one or more graphical interface elements, wherein a first portion of the one or more graphical interface elements is persistently displayed, and wherein a second portion of the one or more graphical interface elements is temporarily displayed for a predetermined period of time together with the first portion of the one or more graphical interface elements; and at expiry of the predetermined period of time, ceasing display of the second portion while maintaining display of the first portion.

19 Claims, 19 Drawing Sheets
(5 of 19 Drawing Sheet(s) Filed in Color)

Related U.S. Application Data

(60) Provisional application No. 62/369,643, filed on Aug. 1, 2016.

(52) U.S. Cl.
 CPC .. *G06T 2200/24* (2013.01); *G06T 2219/2012* (2013.01); *G06T 2219/2016* (2013.01); *G06T 2219/2021* (2013.01)

(58) Field of Classification Search
 USPC .......................................................... 345/589
 See application file for complete search history.

(56) References Cited

U.S. PATENT DOCUMENTS

| | | | |
|---|---|---|---|
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 7,796,155 B1 | 9/2010 | Neely, III et al. | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 10,290,286 B2 * | 5/2019 | Hamaguchi | G01C 21/36 |
| 10,445,936 B1 | 10/2019 | Charlton et al. | |
| 2006/0291666 A1 * | 12/2006 | Ball | G06F 3/165 |
| | | | 381/58 |
| 2011/0202598 A1 | 8/2011 | Evans et al. | |
| 2012/0069028 A1 | 3/2012 | Bouguerra | |
| 2012/0209924 A1 | 8/2012 | Evans et al. | |
| 2013/0172599 A1 | 7/2013 | Suzuki et al. | |
| 2014/0015851 A1 | 1/2014 | Licata | |
| 2014/0028712 A1 | 1/2014 | Keating et al. | |
| 2014/0118397 A1 | 5/2014 | Lee et al. | |
| 2014/0233917 A1 * | 8/2014 | Xiang | H04S 7/30 |
| | | | 386/285 |
| 2014/0244917 A1 | 8/2014 | Maheshwari et al. | |
| 2014/0369506 A1 * | 12/2014 | Arrasvuori | G01S 3/8083 |
| | | | 381/17 |
| 2015/0172599 A1 | 6/2015 | Caldwell | |
| 2016/0088417 A1 | 3/2016 | Kim et al. | |
| 2016/0284134 A1 | 9/2016 | Kamhi et al. | |
| 2017/0265016 A1 * | 9/2017 | Oh | G06K 9/6215 |
| 2017/0287226 A1 | 10/2017 | Du | |
| 2018/0020312 A1 * | 1/2018 | Visser | H04R 5/033 |
| 2018/0047196 A1 | 2/2018 | Du | |
| 2018/0047372 A1 | 2/2018 | Scallie et al. | |

OTHER PUBLICATIONS

"U.S. Appl. No. 15/666,349, Notice of Allowance dated May 8, 2019", 22 pgs.

"U.S. Appl. No. 15/666,349, Response filed Mar. 27, 2019 to Non Final Office Action dated Jan. 14, 2019", 12 pgs.

Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.

U.S. Appl. No. 15/666,349, filed Aug. 1, 2017, Audio Responsive Augmented Reality.

* cited by examiner

US 10,878,635 B1

AUDIO RESPONSIVE AUGMENTED REALITY

PRIORITY CLAIM

This application is a continuation of and claims the benefit of priority of U.S. patent application Ser. No. 15/666,349, filed on Aug. 1, 2017, which claims the benefit of priority of U.S. Provisional Patent Application Ser. No. 62/369,643, filed on Aug. 1, 2016, which are hereby incorporated by reference herein in their entirety.

TECHNICAL FIELD

Embodiments of the present disclosure relate generally to automated processing of video and audio streams. More particularly, but not by way of limitation, the present disclosure addresses systems and methods for generating persistent graphical representations within a video stream and responsive to audio within the video stream.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Although telecommunications applications and devices exist to provide two-way video communication between two devices, there can be issues with video streaming, such as modifying images within the video stream during pendency of a communication session. Telecommunications devices use physical manipulation of the device in order to perform operations. For example, devices are typically operated by changing an orientation of the device or manipulating an input device, such as a touchscreen. Accordingly, there is still a need in the art to improve video communications between devices and modifying video streams in real time while the video stream is being captured.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and should not be considered as limiting its scope.

Figure 1:
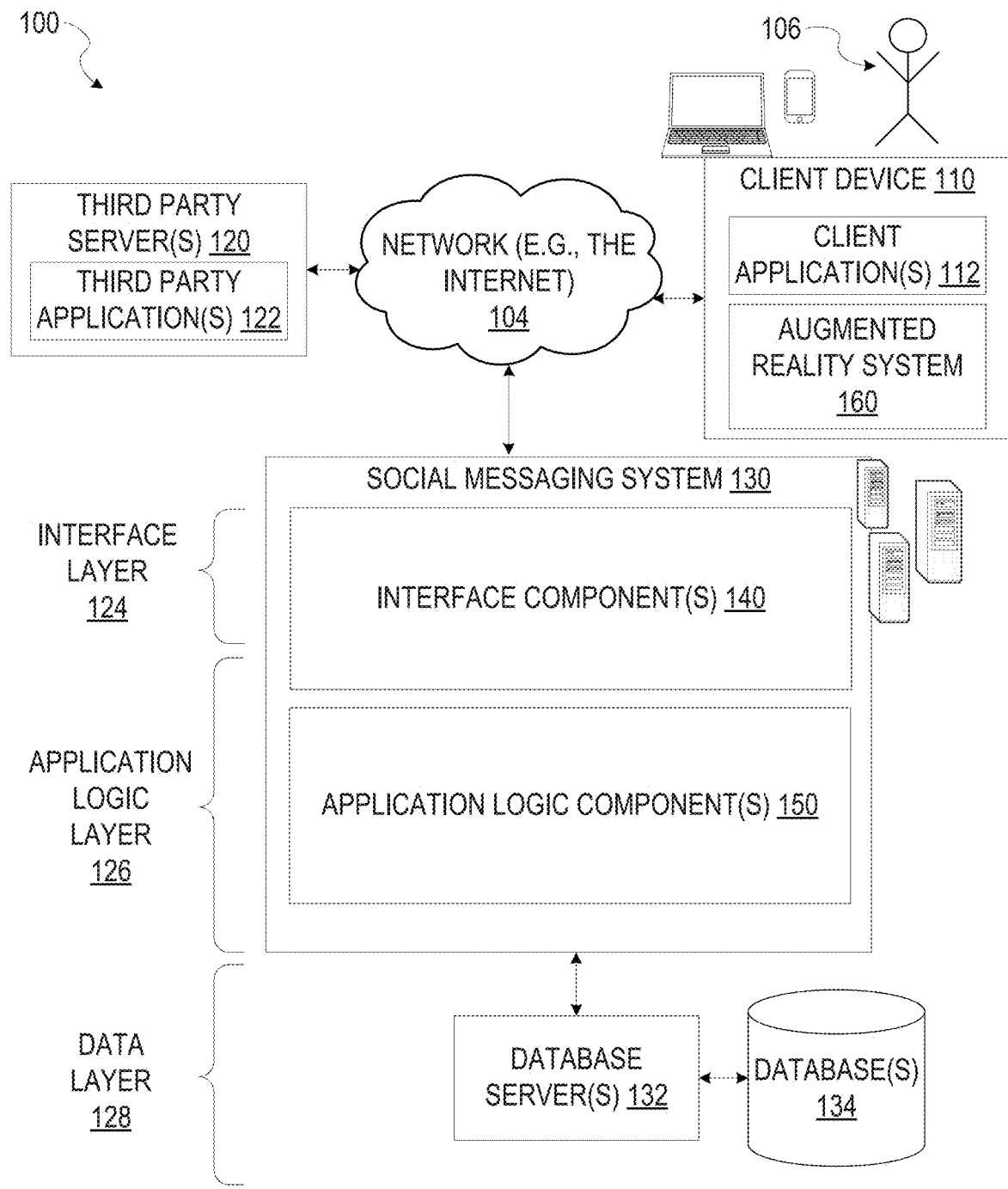
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An augmented reality system is described that immerses the user in a responsive real time environment which automatically modifies visualizations, graphical representations, and other aspects of the augmented environment based on changing conditions in the real world as received through video and audio signals. In various example embodiments, the augmented reality system generates a responsive real time graphic equalizer which adapts to changing audio input of the real world environment. In some embodiments, the experience of the augmented reality system may be optimized for display during evening hours. In some instances, aspects of the video stream may be modified to change real world environment to optimize the augmented reality environment for display of certain graphical representations.

The real time graphical equalizer may be generated as a virtual auroral display. The virtual auroral display imitates natural auroral displays such as the aurora borealis. The real time graphical equalizer may also be generated as an inflatable light sculpture, particles, shapes, colors, filters, objects, or other graphical representations. The graphical representations, generated as a part of the real time graphical equalizer may be rendered as three-dimensional elements. For example particles (e.g., bubbles, stars, twinkling lights, lines of auroral light) may be generated as a three-dimensional particle having modulating characteristics based on the audio/visual input of the real-world environment. In some instances, the modulating characteristics include colors, shapes, color intensities, opacity values, sizes, velocities, and other suitable characteristics.

The augmented reality system may provide users with an augmented reality received through a combination of input devices of a client device, such as a camera and a microphone. In some embodiments, responsive to audio data received through the microphone of the client device, the augmented reality system may automatically modify the modulating characteristics of graphical representations, particles, auroras, or other elements generated and rendered within the augmented real time environment. Where the graphical representations are auroras, the augmented reality system may generate glowing, moving lines of light that resemble the aurora borealis which fade into view above a person depicted within a video stream. Graphical elements may also be generated as particle animations appearing and bouncing around the person in time to a sound within the audio data.

In some example embodiments, at least a portion of the augmented reality system may be implemented on a client device of a user. The user opens an application, via an input device, stored on the client device. Once the application opens, initiating the augmented reality system, the user moves the client device to generate an orientation change. For example, the user may move the client device upward towards the sky. The user may then perform an extended user input (e.g., press and hold a touchscreen). Based on the change in orientation of the client device and upon the user input exceeding a time threshold, the augmented reality system may initiate a visualization of a real time augmented environment. The augmented reality system may identify data from the video stream (e.g., audio or video data) and generate graphical or visual elements. The augmented reality system may then render the graphical or visual elements within a video stream received through the camera of the client device and presents the graphical or visual elements on a display device of the client device in the real time augmented environment.

For example, in some embodiments, the user opens the application on a smartphone and moves the smartphone skyward. Opening the application may initiate a video stream from a camera of the smartphone and display the video stream in real time on a display device of the smartphone. The user then presses and holds a touchscreen on the smartphone to initiate the augmented reality system. The augmented reality system may unlock a dynamic light visualization (e.g., an aurora) in a portion of the video stream such that the dynamic light visualization is displayed over at least a portion of the sky depicted within the video stream. The augmented reality system may analyze audio signals or data received through a microphone of the smartphone and cause changes to the dynamic light visualization (e.g., movement in the aurora; new particles; changes in size, shape, and speed of the particles) and display the changes in the dynamic light visualization in real time. When the user moves the smartphone to capture additional elements in real world surroundings, the augmented reality system may maintain display (e.g., including periodic or real time changes) of at least a portion of the dynamic light visualization where the sky remains visible in one or more frames of the video stream. In some example embodiments, when the user moves the smartphone in a manner that temporarily removes the sky from frames of the video stream, once a portion of the sky reenters the video stream, the augmented reality system resumes display and modification of the dynamic light visualization in the portion of the video stream depicting the sky.

The above are some specific example embodiments. The various embodiments of the present disclosure relate to devices and instructions by one or more processors of a device to modify an image or a video stream transmitted by the device to another device while the video stream is being captured (e.g., modifying a video stream in real time). An augmented reality system is described that identifies and tracks objects and areas of interest within an image or across a video stream and through a set of images comprising the video stream. In various example embodiments, the augmented reality system generates and modifies visual elements within the video stream based on data captured from the real-world environment in captured by within the video stream and an accompanying audio stream.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an augmented reality system 160 such that components of the augmented reality system 160 configure the client device 110 to perform a specific set of functions with respect to operations of the augmented reality system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the augmented reality system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be pa of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the augmented reality system 160 capable of identifying, tracking, and modifying video data during capture of the video data by the client device 110. Similarly, the client device 110 includes a portion of the augmented reality system 160, as described above. In other examples, client device 110 may include the entirety of augmented reality system 160. In instances where the client device 110 includes a portion of (or all of) the augmented reality system 160, the client device 110 can work alone or in cooperation with the social messaging system 130 to provide the functionality of the augmented reality system 160 described herein.

In some embodiments, the social messaging system 130 may be an ephemeral message system that enables ephemeral communications where content (e.g, video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the augmented reality system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
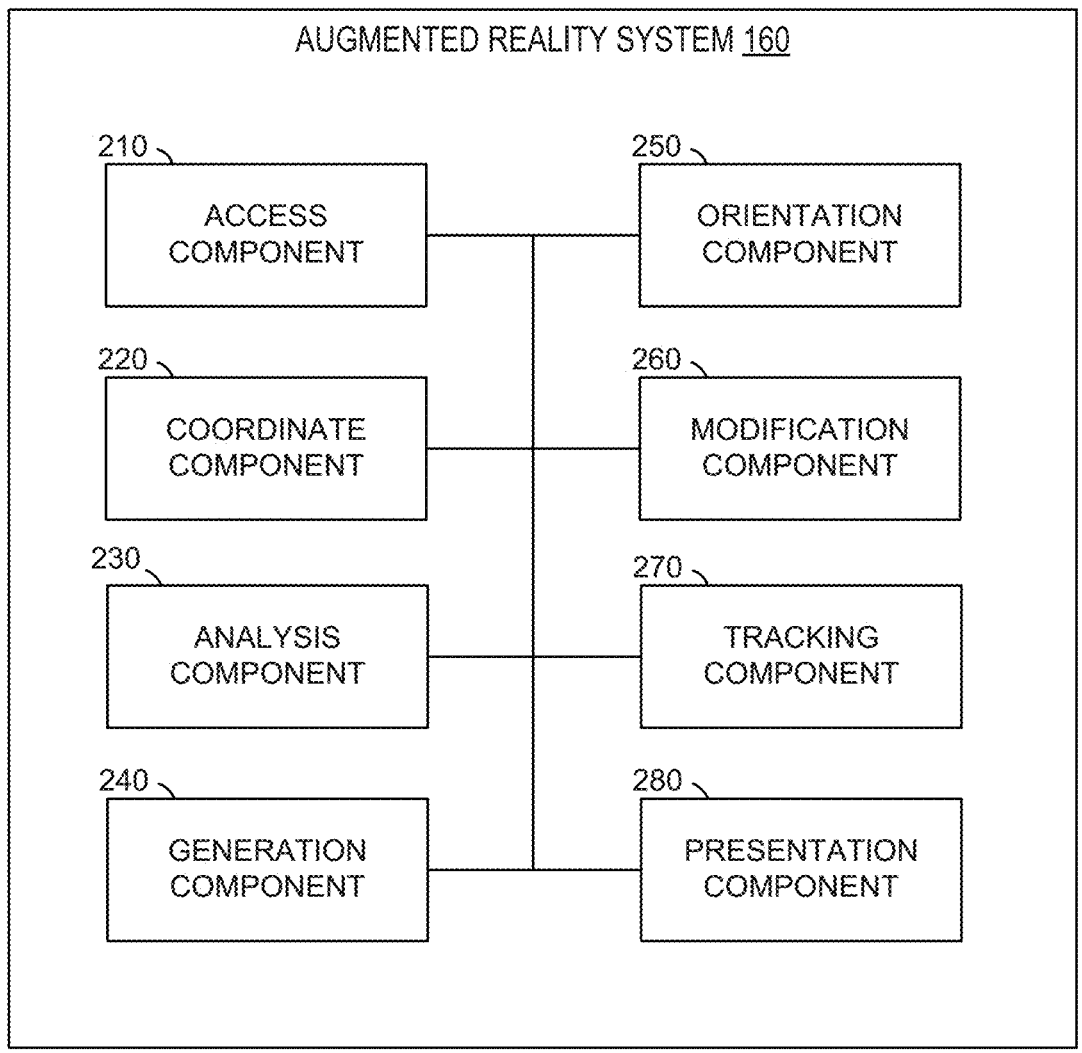
FIG. 2 is a diagram illustrating an augmented reality system, according to some example embodiments.

In FIG. 2, in various embodiments, the augmented reality system 160 can be implemented as a standalone system or implemented in conjunction with the client device 110, and is not necessarily included in the social messaging system 130. The augmented reality system 160 is shown to include an access component 210, a coordinate component 220, an analysis component 230, a generation component 240, an orientation component 250, a modification component 260, a tracking component 270, and a presentation component 280. All, or some, of the components 210-280, communicate with each other, for example, via a network coupling, shared memory, and the like. Each component of components 210-280 can be implemented as a single component, combined into other components, or further subdivided into multiple components. Other components not pertinent to example embodiments can also be included, but are not shown.

Figure 3:
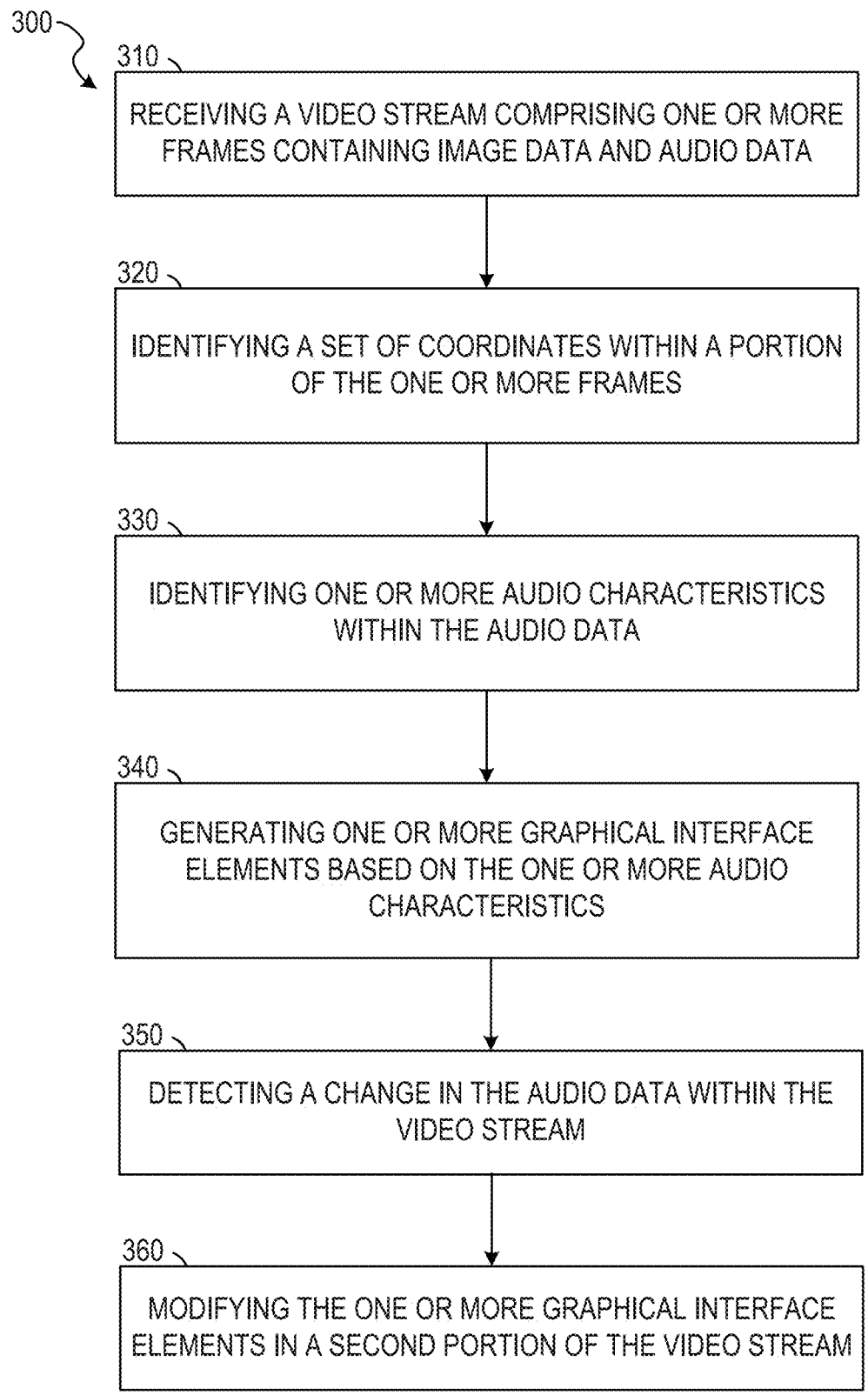
FIG. 3 is a flow diagram illustrating an example method for generating responsive augmented reality elements within a graphical user interface, according to some example embodiments.

FIG. 3 depicts a flow diagram illustrating an example method 300 for generating responsive augmented reality elements within a graphical user interface, according to some example embodiments. The augmented reality elements may be generated and rendered or otherwise depicted in a video stream while the video stream is being captured by the client device 110. The operations of method 300 may be performed by components of the augmented reality system 160, and are so described below for purposes of illustration.

In operation 310, the access component 210 receives or otherwise accesses a video stream. The video stream may comprise one or more frames containing image data and audio data. The one or more input devices may include a camera, image capture device, video capture device, a microphone, and any other suitable input devices capable of capturing the video stream and audio data.

In some embodiments, the augmented reality system 160 may be preloaded or pre-cached on the client device 110 and may be triggered by a combination of user input and location. For example, the display aspects of the augmented reality system 160 may be limited to a predetermined location, geographical region, street address, set of coordinates, or distances extending from one or more of the former. By way of further example, the augmented reality system 160 may be georeferenced and time referenced such that a period (e.g., one day) ahead of a scheduled time, at least a portion of the augmented reality system 160 may be pre-cached on the client device 110. Client devices 110 which receive the pre-caching may be a set distance from a location (e.g., fifty-six miles from the Santa Monica Pier). The augmented reality system 160 may be activated within an ephemeral messaging system proximate to the scheduled time. In some instances, the augmented reality system 160 may be activated for users who engage in one or more other aspect of the ephemeral messaging system during a predetermined previous time period.

In operation 320, the coordinate component 220 identifies a set of coordinates within a portion of the one or more frames of the video stream. Upon capturing the video stream, the augmented reality system 160 may identify the set of coordinates within a portion of the one or more frames of the video stream. The set of coordinates may be determined using external information, landmarks within the image, generated and overlaid without regard to aspects of the depicted image, or any other suitable manner.

In operation 330, the analysis component 230 identifies one or more audio characteristics within the audio data of the video stream. The analysis component 230 may identify the audio characteristics after identifying the set of coordinates. The one or more audio characteristics may include one or more components of the audio data which may be analyzed by the analysis component 230. In some embodiments, the one or more audio characteristics comprise one or more frequencies, a volume, one or more time signatures, one or more tempos, one or more beats, one or more timbre, one or more musical instruments, one or more voices, one or more keys, one or more pitches, or any other aspect of audio data which may be analyzed to differentiate between two or more audio streams, types of audio (e.g., ambient noise and music), or any other sound received from a sound capturing input device.

In operation 340, the generation component 240 generates one or more graphical interface elements (e.g., augmented reality elements) based on the one or more audio characteristics within the audio data. In some embodiments, the generation component 240 generates the graphical interface elements in response to the analysis component 230 identifying the one or more audio characteristics. The one or more graphical interface elements may be generated in a first portion of the video stream (e.g., a portion of the frames of the video stream). In some embodiments, the first portion of the video stream in which the graphical elements are generated and presented follows a portion of the video stream after one or more of the coordinates being identified, the audio characteristics being identified, and the graphical elements being generated.

Figure 4:
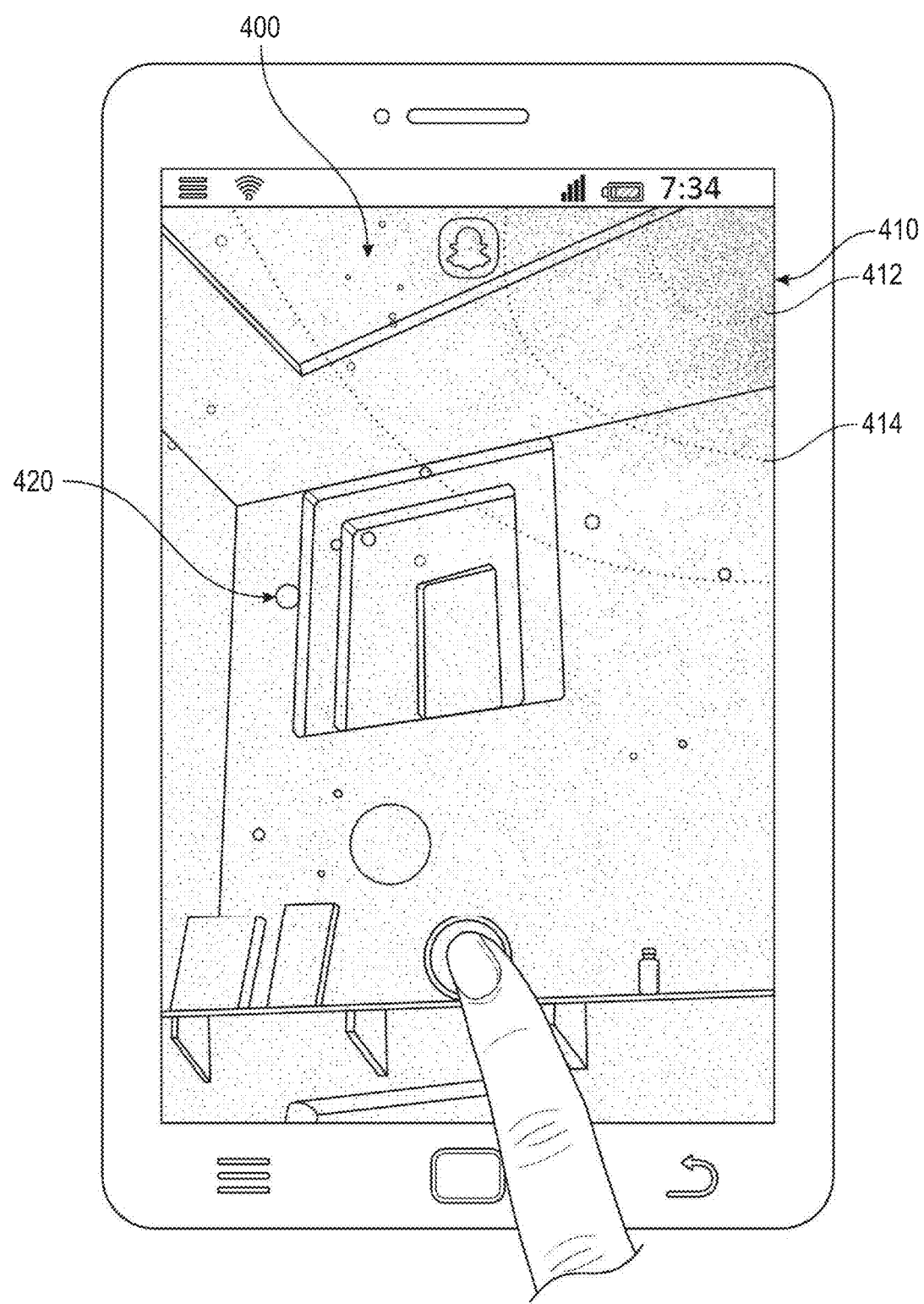
FIG. 4 is a user interface diagram depicting the augmented reality system in operation, according to some example embodiments.
Figure 4A:
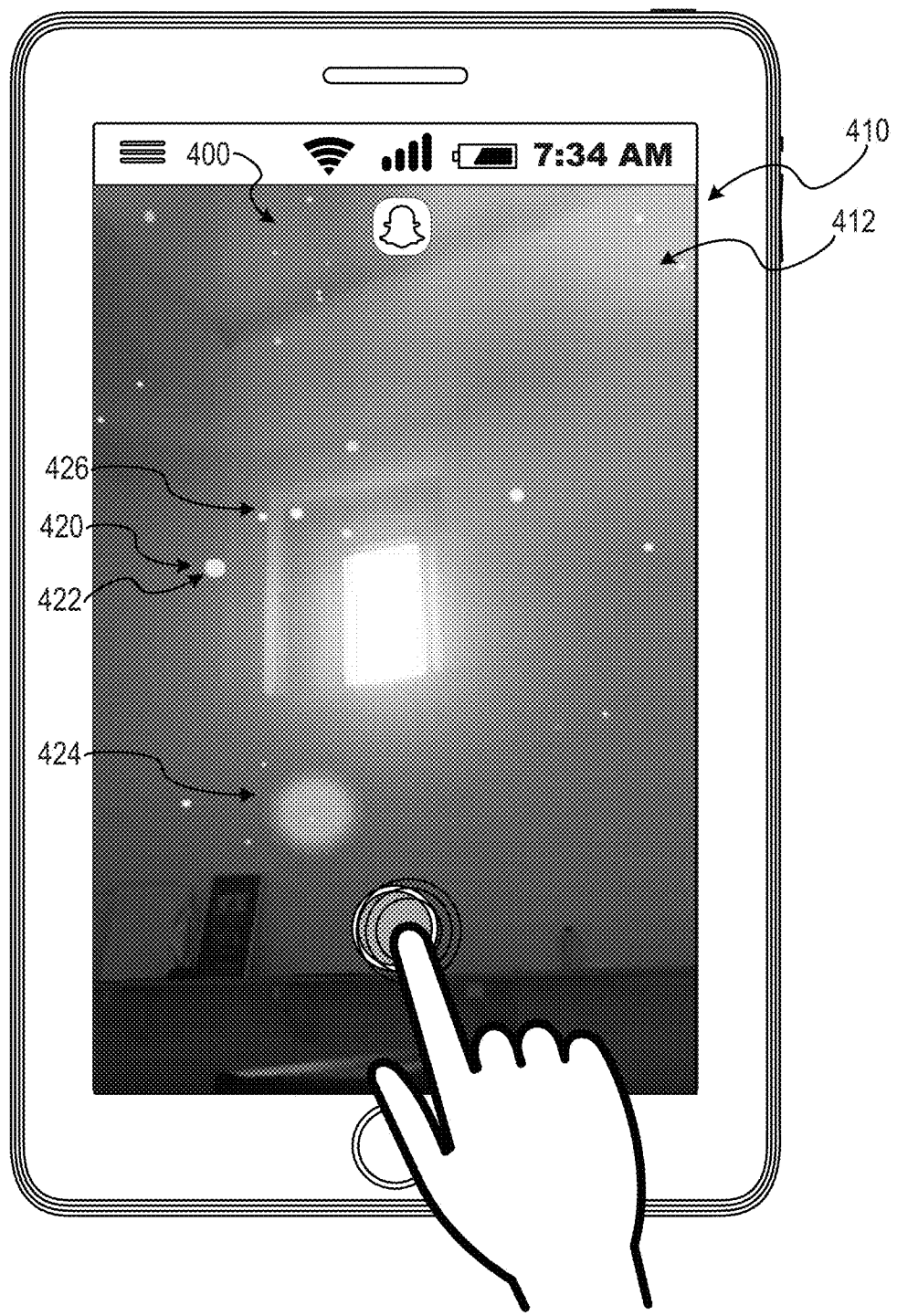
FIG. 4A is a user interface diagram depicting the augmented reality system in operation, according to some example embodiments.

For example, as shown in FIG. 4, the one or more graphical elements may be positioned within the video stream, in real time, as the video stream is being captured. In FIG. 4, the graphical elements 400 may include a first set of graphical elements 410 depicted in a first region 412 and a second set of graphical elements 420. The first set of graphical elements 410 may be or combine to form an aurora within the video stream positioned within a predefined but variable area of one or more frames of the video stream. The aurora may be defined within the first region 412 by a density, intensity, or color range of the first set of graphical elements 410. As shown in color in FIG. 4A, the first set of graphical elements 410 is depicted as an aqua or light blue hue, an aurora, in the first region 412. As shown in FIG. 4, the first region is generally defined by a dotted line as a representation of a color barrier. As shown in FIG. 4A, the first region 412 is shown as a blue or aqua colored light with a first intensity and opacity. A second region 414 is shown in FIG. 4 as defined by a second dotted region. In FIG. 4A, the second region 414 includes blue light having a differing hue and opacity than the first region 412. Although FIG. 4A shows the first set of graphical elements 410 as aqua and the first region 412 as the aqua color in a first intensity and hue and the second region 414 with a second intensity and hue of blue, the graphical elements may be any suitable color, such that aqua is a representational color which may be changed, modified, or replaced with another color, such as a green, pink, yellow, or any other suitable color range. The second set of graphical elements 420 may include a set of individual particles of any suitable shape. As shown in FIG. 4, the second set of graphical elements 420 includes a set of circles or dots suspended in the field of view of the image capture device. The second set of graphical elements 420 may be variable in position, size, and movement (e.g., velocity and direction of movement). For example, as shown in FIG. 4A, the second set of graphical elements 420 may include a plurality of dots, each dot having a different color, size, diffusion around edges, and position. As shown in FIG.

4A, a first graphical element 422, of the second set of graphical elements 420, is depicted as a yellow dot, having a high opacity and intensity. A second graphical element 424 is shown with a second color (e.g., rose), a second opacity (e.g., more transparent or translucent than the first graphical element 422), and a second edge diffusion. For example, as shown the second graphical element 424 has more diffuse edges than shown for the first graphical element 422.

Figure 5:
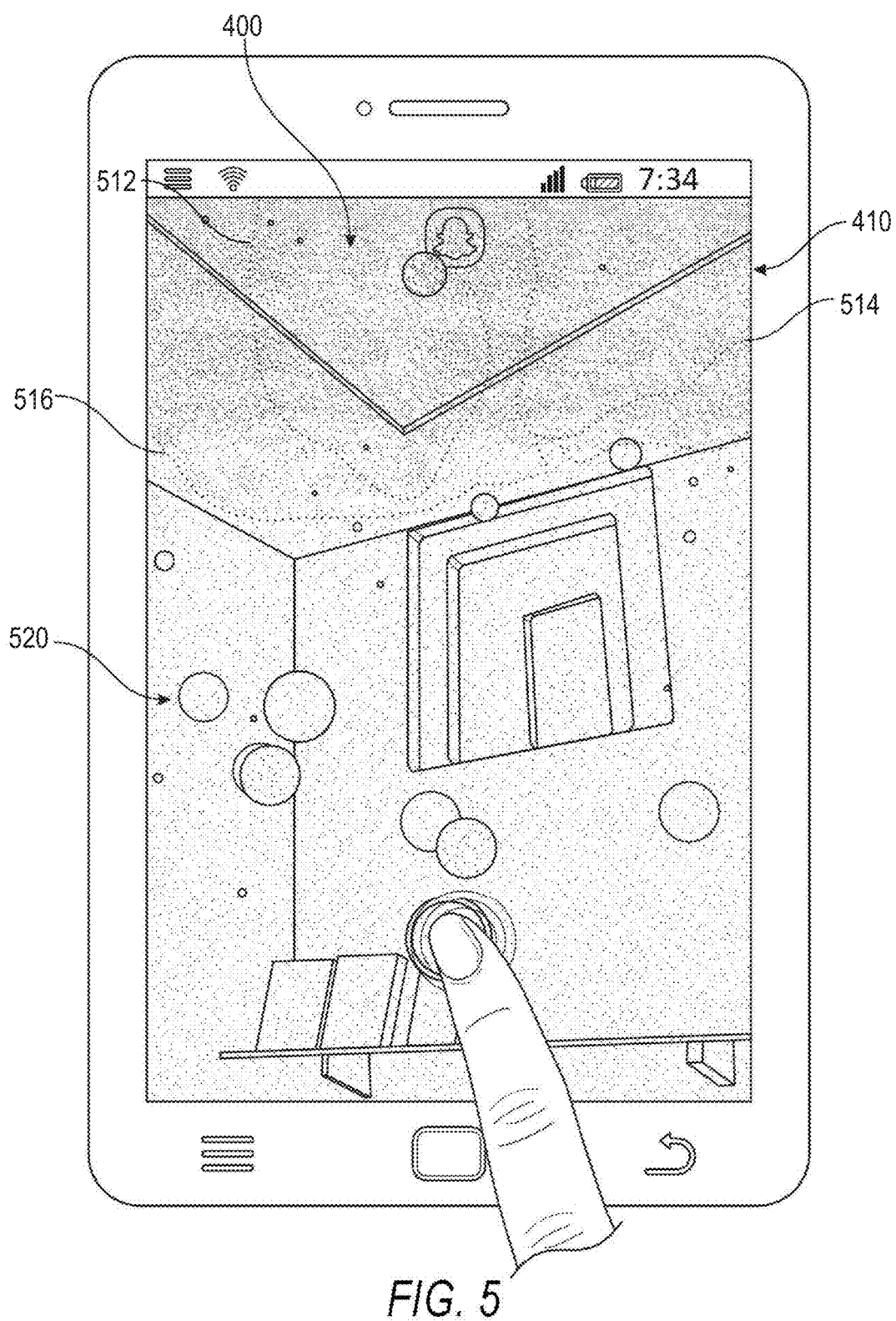
FIG. 5 is a user interface diagram depicting the augmented reality system in operation, according to some example embodiments.
Figure 5A:
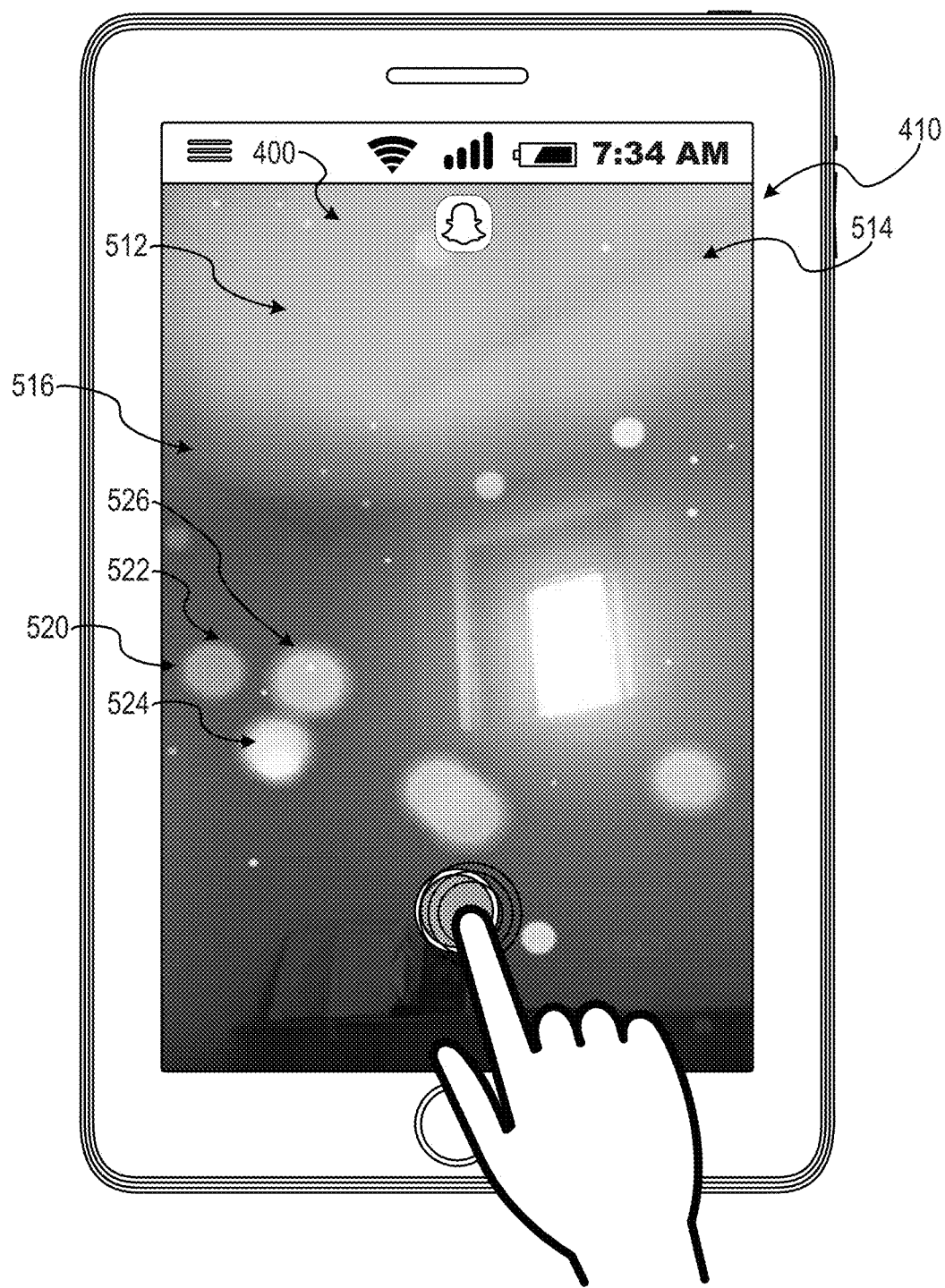
FIG. 5A is a user interface diagram depicting the augmented reality system in operation, according to some example embodiments.
Figure 6:
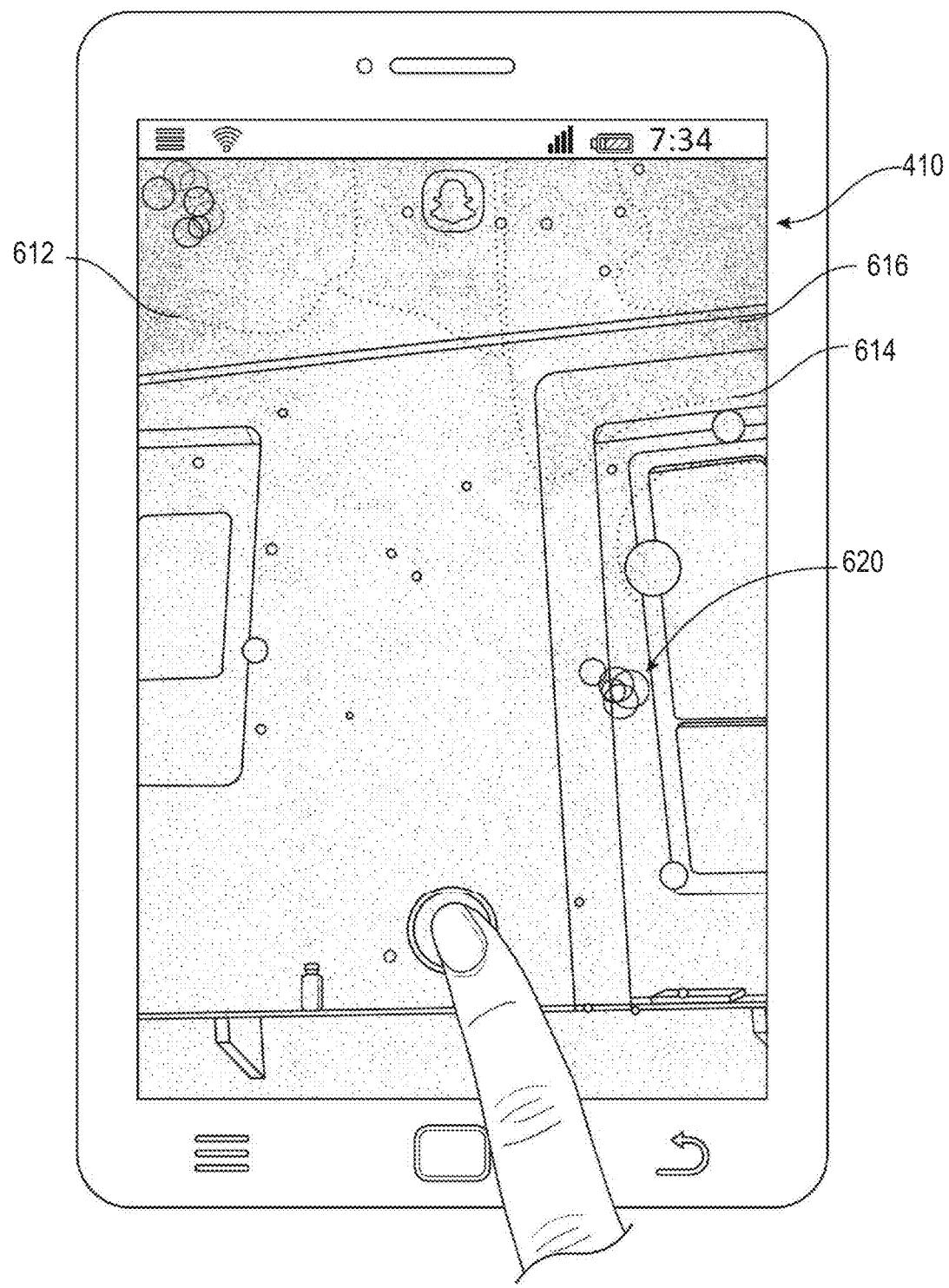
FIG. 6 is a user interface diagram depicting the augmented reality system in operation, according to some example embodiments.
Figure 6A:
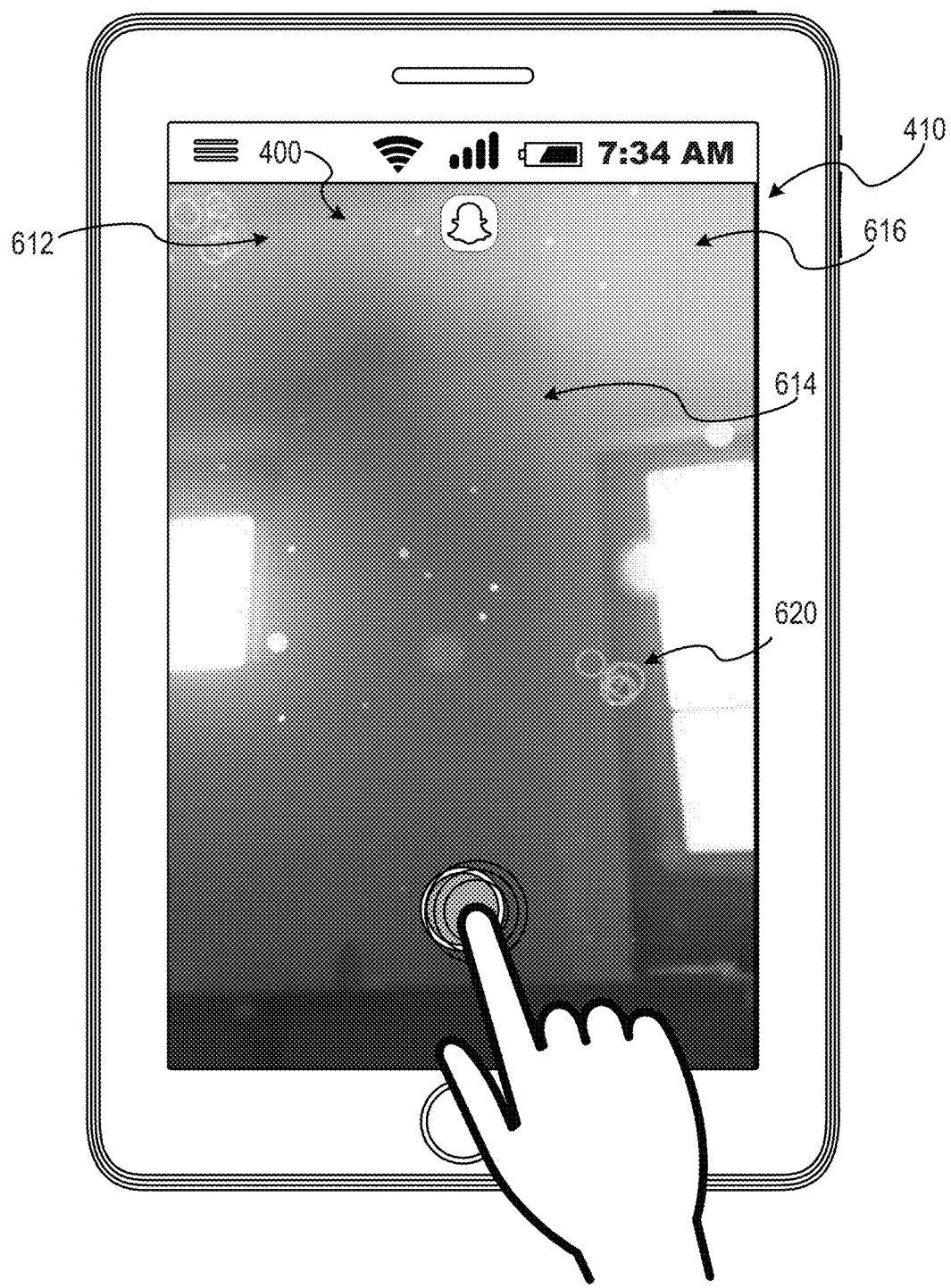
FIG. 6A is a user interface diagram depicting the augmented reality system in operation, according to some example embodiments.

In some embodiments, the graphical elements may be persistent based on the audio characteristics. The graphical elements, in these instances, may persist within the video stream while an audio characteristic associated with the graphical element is being received by the audio capture component. While the graphical elements are present within the video stream, components of the augmented reality system 160 may modify the graphical elements according to behaviors associated with the graphical elements based on changes in the audio data received by the audio capture device, as described below in more detail. For example, as shown in FIGS. 4-6, the first set of graphical elements 410 (e.g., the aurora) is persistent, being presented in multiple frames of the video stream. As shown in FIGS. 4A, 5A, and 6A, the aurora of the first set of graphical elements 410 may change shape, color, and size based on changes in the audio stream. In some embodiments, the persistence of the graphical elements may define a presentation of a form of the graphical element across multiple frames of the video stream, while the persistent graphical element is variable in its presentation across the frames. For example, as shown in FIGS. 4-6, the first set of graphical elements 410 is persistent, presented in both frames of the video stream, and is variable in color, shape, opacity, and position within the frames. As shown within FIGS. 4-6, the first set of graphical elements may change position (e.g., concentrating in a top right corner, occupying a top third of the frame, and occupying a top fourth of the frame), color (e.g., all blue or aqua, to partially aqua and partially dark blue, to partially aqua and partially green), opacity, and shape. Further, as shown in FIGS. 4, 5, and 6, regions of the first set of graphical elements 410 may differ over time. As shown in FIG. 4, the first region 412 and the second region 414 are shown at first positions. In FIG. 5, changes in the first set of graphical elements 410 cause a modification of the first region 412 and the second region 414 such that the first set of graphical elements 410 may be divided into a plurality of regions 512, 514, and 516. As shown in FIG. 5A, the color intensity defining the plurality of regions provides bright intensity aqua colors defining a third region 512 and a fourth region 514, of the plurality of regions. A fifth region 516 is shown having a different color hue, a darker blue than the aqua of the third region 512 and the fourth region 514. As shown in FIGS. 6 and 6A, the plurality of regions 512, 514, and 516 may further change position and composition. As shown in FIG. 6, a subsequent set of regions 612, 614, and 616 are shown. In FIG. 6A, the subsequent set of regions are defined by color variations in the first set of graphical elements 410. As shown, a sixth region 612 includes a portion of the first set of graphical elements 410 providing a yellow to green spectrum of color at a first intensity. A seventh region 614 includes a portion of the first set of graphical elements 410, having a different color than those in the sixth region 612. The portion of the first set of graphical elements 410 in the seventh region 614 provide a plurality of blues, from aqua to dark blue, at a first intensity range. The portion of the first set of graphical elements 410 in the eighth region 616 have a more uniform hue (e.g., aqua) than the portion of the first set of graphical elements 410 in the seventh region 614, but have a higher and more uniform intensity, such that a boundary between the seventh region 614 and the eighth region 616 may be viewed as one or more of an intensity threshold and a hue threshold.

In some embodiments, the graphical elements may be temporary or ephemeral based on the audio characteristics. The graphical elements may be generated for a predetermined period of time and cease presentation within the video stream after the period of time has elapsed. The temporary graphical elements may be initially generated, disappear, and be regenerated based on the same audio characteristic being detected and remaining present within the video stream and audio data. In some embodiments, a portion of the one or more graphical elements may be persistent while a portion of the graphical elements may be temporary. As shown in FIGS. 4-6, the second set of graphical elements 420, depicted as variable particles, may be temporary elements. For example, the second set of graphical elements 420 depicted in FIGS. 4 and 4A may change over time to a second set of graphical elements 520, shown in FIGS. 5 and 5A. As shown, a portion of the second set of graphical elements 420 have changed in size, shape, opacity, position, or color to be included in the second set of graphical elements 520. In FIG. 4A, the second set of graphical elements 420 are shown including the first graphical element 422, a small yellow dot, the second graphical element 424, a larger diffuse red or rose colored dot, and third graphical elements 426 formed by a plurality of varying sized white dots having a relatively uniform hue, intensity, and edge diffusion. Modification of the graphical elements transforms the second set of graphical elements 420 into the second set of graphical elements 520, shown in FIGS. 5 and 5A. As shown, a portion of the second set of graphical elements 420 have terminated and been replaced by elements of the second set of graphical elements 520. As shown in FIGS. 4, 4A, 5, and 5A, the second set of graphical elements 520 include graphical elements 522, 524, and 526, among others. The graphical element 522, a diffuse magenta colored dot; the graphical element 524, diffuse golden dot; and the graphical element 526, a diffuse violet dot, may be included in the new portion of a second set of graphical elements 520. These graphical elements 522, 524, and 526 represent graphical elements having a different shape, character, and color range than have been generated and populated within the video stream in previous iterations of the second set of graphical elements. As shown in FIGS. 6 and 6A, the second set of graphical elements 420 or 520 may further be modified into the second set of graphical elements 620 with differing shapes, patterns, or fill characteristics. As shown in FIG. 6, the second set of graphical elements 620 are shown as hollow circles. FIG. 6A shows the second set of graphical elements 620 as differing in not only shape and size, but color as well. The second set of graphical elements 620 are a pink color not included in previously generated iterations of the second set of graphical elements shown in FIGS. 4A and 5A. Although described with respect to certain colors (e.g., blue, purple, magenta, pink, yellow, etc.) it should be understood that changes in color may include changes to any suitable color in modifying the graphical elements depicted and described.

In operation 350, the analysis component 230 detects a change in the audio data within the video stream. In some embodiments, the analysis component 230 analyzes the audio data to determine changes in at least one of the one or more audio characteristics of the audio data. For example, the analysis component 230 may identify a change in volume detected in the audio data such as a transition within a song during a concert or a transition between songs at a concert. The analysis component 230 may also detect changes in tempo, instrument composition of a musical piece, changes in time signature, changes in beat, changes in timbre, changes in frequency, or any other changes within the audio data.

In operation 360, the modification component 260 modifies the one or more graphical interface elements in a second portion of the video stream. In some embodiments, the modification component 260 modifies the one or more graphical interface elements in response to the change in the audio data. In these instances, one or more aspects of the one or more graphical elements are modified within the second portion of the video stream while the graphical element is present within the video stream. In some embodiments, the one or more aspects or visual characteristics modified by the augmented reality system 160 comprise at least one of a color value, a brightness value, an intensity value, an opacity value, a position within at least one frame of the video stream, a size, shape, an oscillation, a pulse, velocity of the graphical element, or relative positions of two or more graphical elements, as shown in FIGS. 4-6 and 4A-6A. Although specific aspects have been described or referenced with respect to specific embodiments, it should be understood that the augmented reality system 160 may modify any suitable aspect of a graphical element present within the video stream. In some instances, modification of the one or more graphical elements may include ending presentation (e.g., inclusion in a visible portion of the video stream) of a graphical element or generation of an additional graphical element.

In some embodiments, the user may end the real time augmented reality environment by selecting a graphical interface element. For example, the graphical interface element may be an "X" or other termination indicator positioned at a fixed point within the display device of the client device 110 and depicted as imposed over at least a portion of the video stream.

Figure 7:
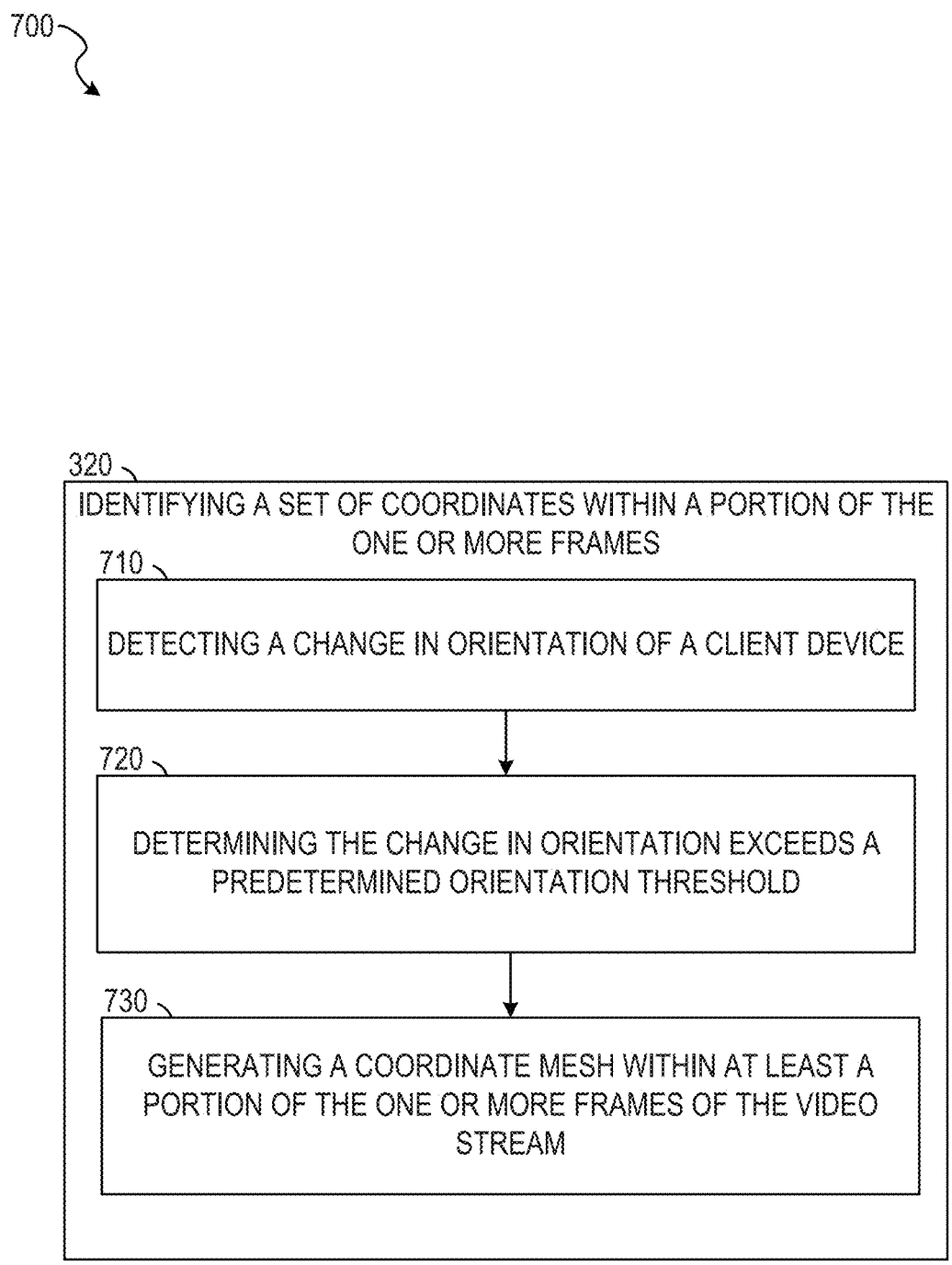
FIG. 7 is a flow diagram illustrating an example method for generating responsive augmented reality elements within a graphical user interface, according to some example embodiments.

FIG. 7 depicts a flow diagram illustrating an example method 700 for generating responsive augmented reality elements within a graphical user interface, according to some example embodiments. The operations of method 700 may be performed by components of the augmented reality system 160. In some instances, certain operations of the method 700 may be performed using one or more operations of the method 300 or as sub-operations of one or more operations of the method 300, as will be explained below in more detail. For example, as shown in FIG. 7, the method 700 may be performed as part of or in conjunction with operation 320 of the method 300.

In operation 710, the orientation component 220 detects a change in orientation of the client device 110. In some instances, the coordinate component 220 detects the change in orientation using one or more of a gyroscope, a gyroscopic sensor, an accelerometer, an altitude sensor, proximity sensor, near field communication sensor, a rotation sensor, a global positioning system(GPS) sensor, an audio capture component (e.g., a microphone), an image capture component (e.g., a camera or video camera), or any other suitable sensor. For example, a gyroscopic sensor within the client device 110 may detect a change in relative position of the client device 110 moving upward toward the sky. Although described with reference to an upward or skyward change in position, it should be understood that the change in relative position may be a lateral or sideways motion, a rotational position change, or any other suitable motion.

In operation 720, the coordinate component 220 determines the change in orientation exceeds a predetermined orientation threshold. In some embodiments, the change in orientation includes a vertical component. In some instances, where the change in orientation includes a vertical component, the predetermined orientation threshold may be a vertical orientation threshold. The predetermined orientation threshold may be a distance (e.g., a vertical, horizontal, or diagonal distance), an angular position (e.g., vertical, horizontal, or diagonal), or any other measurement of a change in position of the client device 110.

Figure 8:
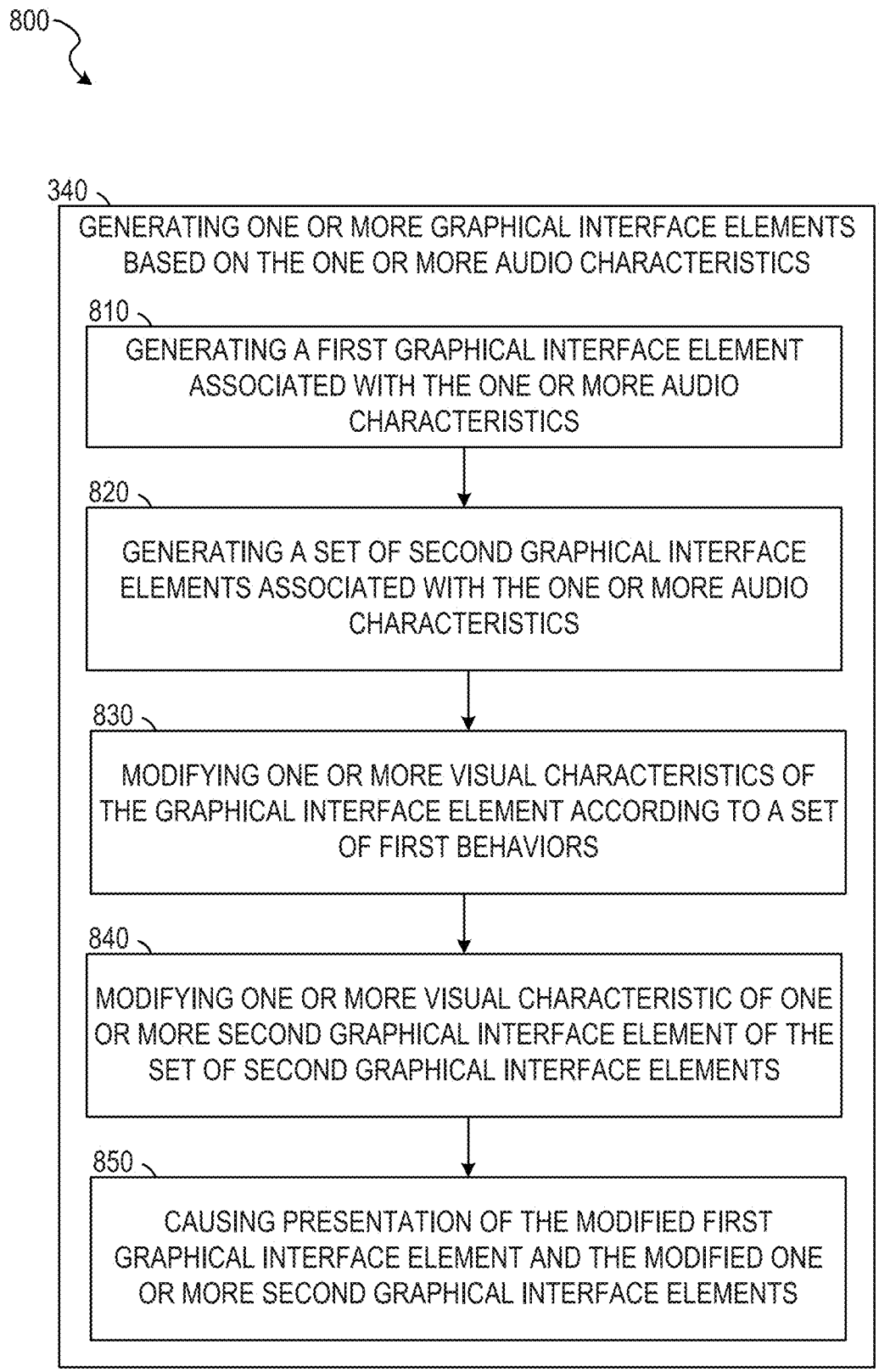
FIG. 8 a flow diagram illustrating an example method for generating responsive augmented reality elements within a graphical user interface, according to some example embodiments.

In operation 730, the coordinate component 220 generates a coordinate mesh within at least a portion of the one or more frames of the video stream. The coordinate mesh may be a set of connected polygons joined at vertices corresponding to individual coordinates. In some embodiments, the coordinate mesh is a grid pattern distributed across at least a portion of the field of view of the image capture component of the client device 110. In some instances, the set of coordinates may be displayed within one or more frames of the video stream, at least temporarily, after identification of the set of coordinates. The coordinate mesh may also be displayed within one or more frames of the video stream. For example, in some instances, once the coordinate mesh is generated, the coordinate mesh FIG. 8 depicts a flow diagram illustrating an example method 800 for generating responsive augmented reality elements within a graphical user interface, according to some example embodiments. The operations of method 800 may be performed by components of the augmented reality system 160. In some instances, certain operations of the method 800 may be performed using one or more operations of one or more of the methods 300 or 700 or as sub-operations of one or more operations of one or more of the methods 300 or 700, as will be explained below in more detail. For example, as shown in FIG. 8, the method 800 may be performed as part of or in conjunction with operation 340 of the method 300.

In operation 810, the generation component 240 generates a first graphical interface element associated with the one or more audio characteristics. In some embodiments, the first graphical interface element is generated with a set of first behaviors associated with at least one audio characteristic of the one or more audio characteristics. The first graphical interface element may be generated in a manner similar to that described above.

In operation 820, the generation component 240 generates a set of second graphical interface elements associated with the one or more audio characteristics. In some embodiments, the set of second graphical interface elements are generated with a set of second behaviors associated with at least one audio characteristic of the one or more audio characteristics. In some instances, the set of second graphical interface elements may be generated in a manner similar to or the same as described above.

In some embodiments, the behaviors of the set of first behaviors and the set of second behaviors differ from one another. In some embodiments, where the first graphical element is an aurora, the set of first behaviors comprise temporary changes in the first graphical element which oscillate between a first state and a second state, as shown in FIGS. 4-6. In some instances, the set of first behaviors comprise a timing cycle, a path, a position cycle, a size cycle, an opacity cycle, or any other set of actions, changes, or operations coordinating a change between a first state and a second state. In some instances, the set of second graphical elements may be a set of particles, having variables positions within the frames of the video stream, as shown in FIGS. 4-6.

Figure 9:
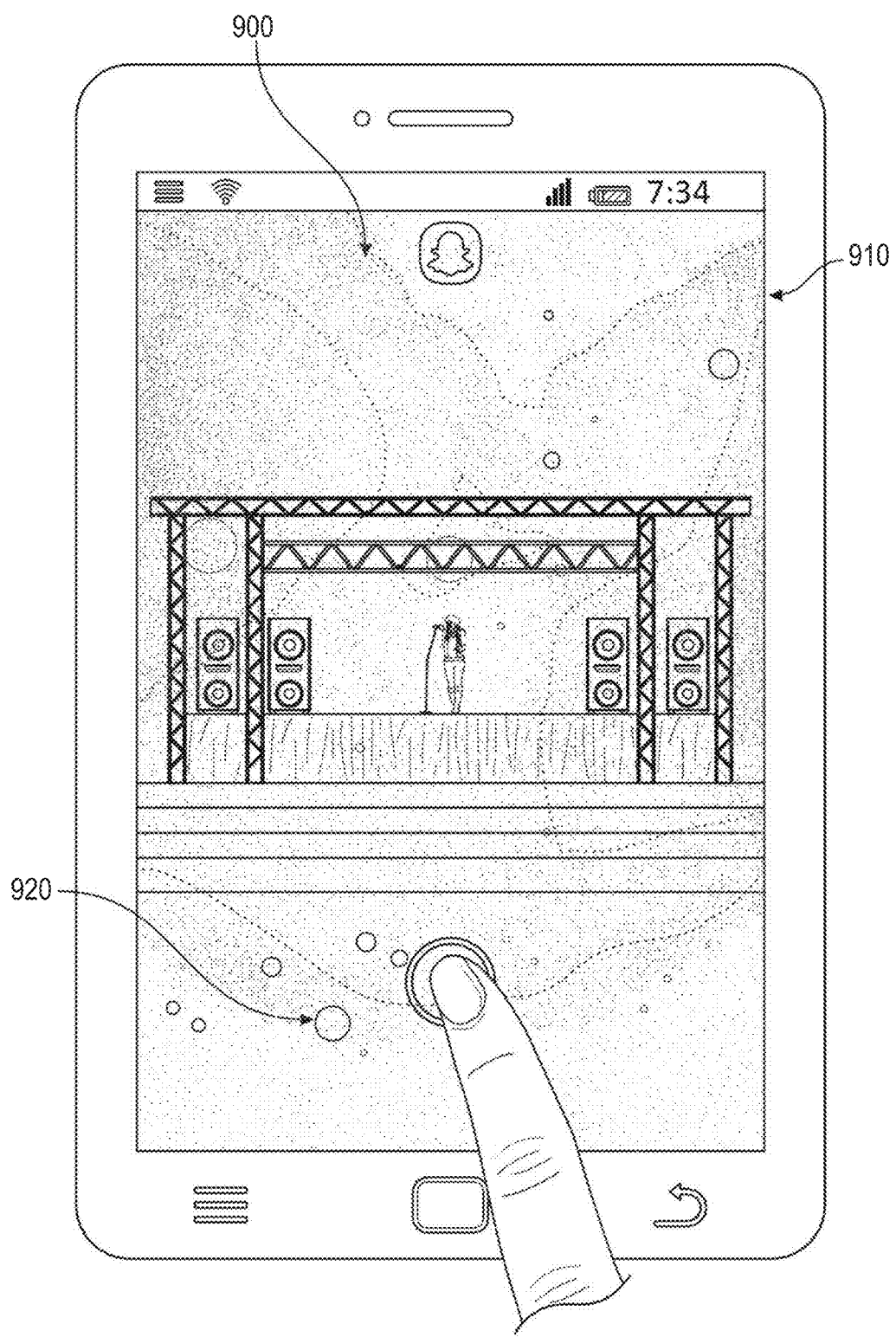
FIG. 9 is a user interface diagram depicting the augmented reality system in operation, according to some example embodiments.
Figure 10:
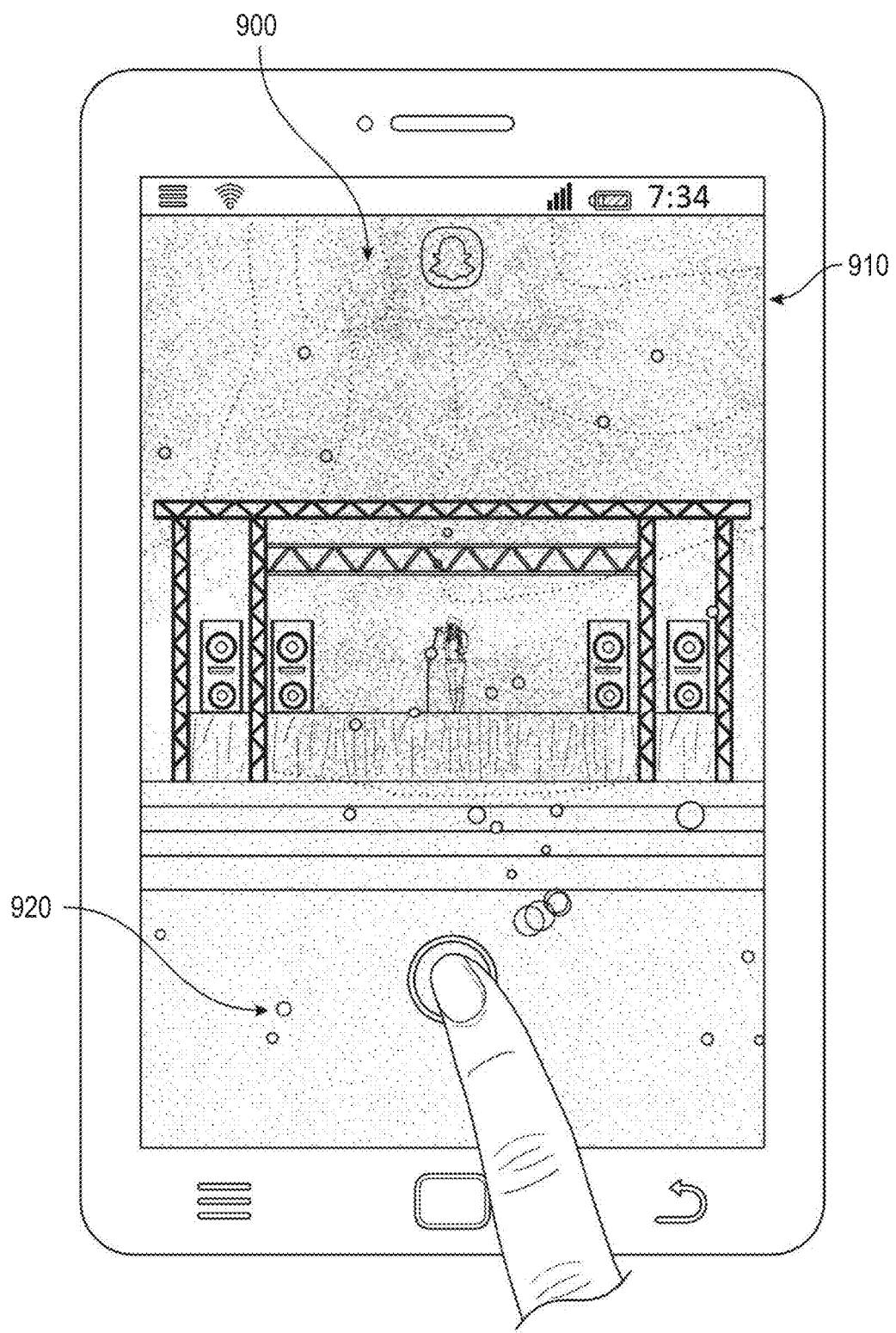
FIG. 10 is a user interface diagram depicting the augmented reality system in operation, according to some example embodiments.
Figure 15:
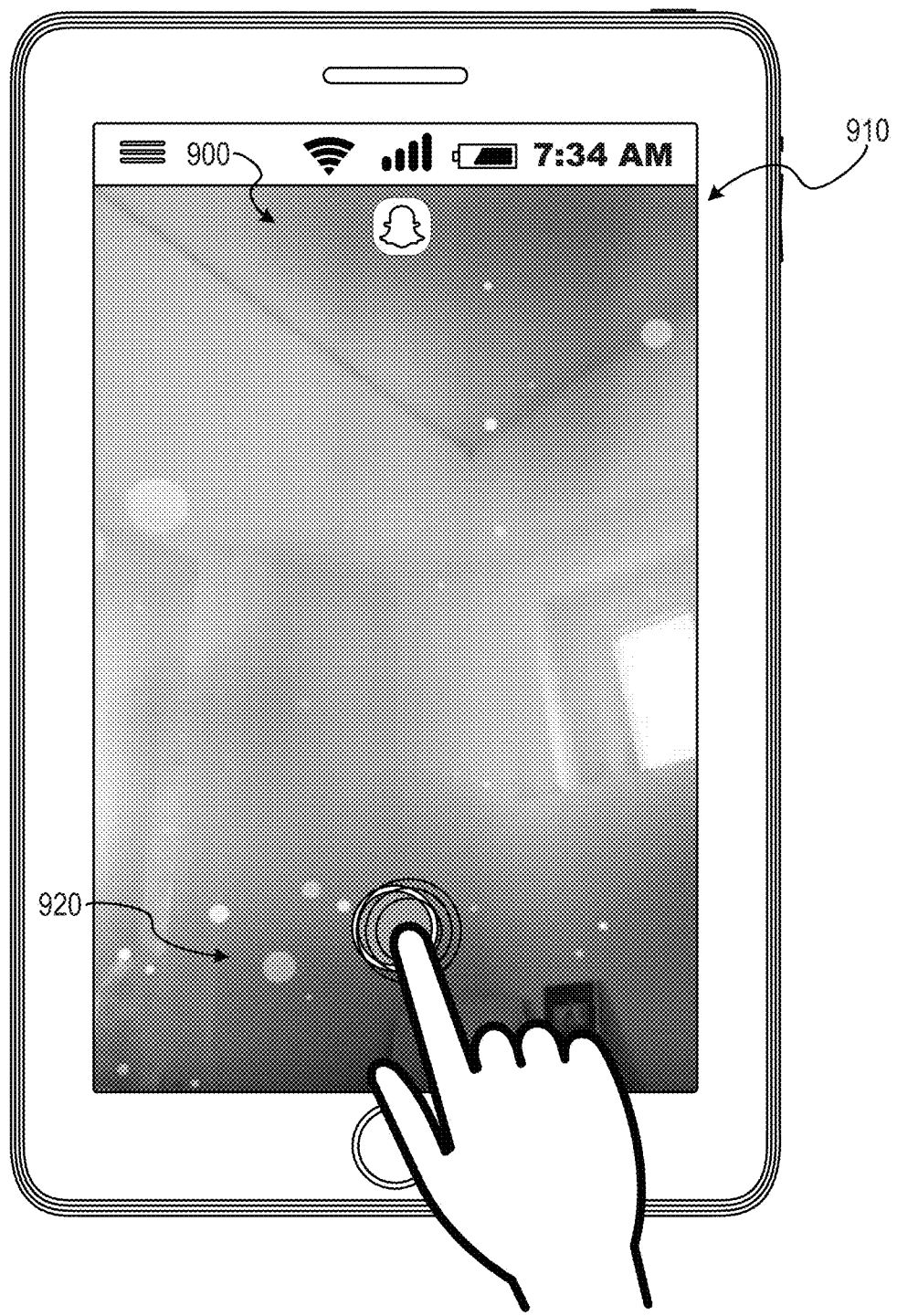
FIG. 15 is a user interface diagram depicting the augmented reality system in operation, according to some example embodiments.
Figure 16:
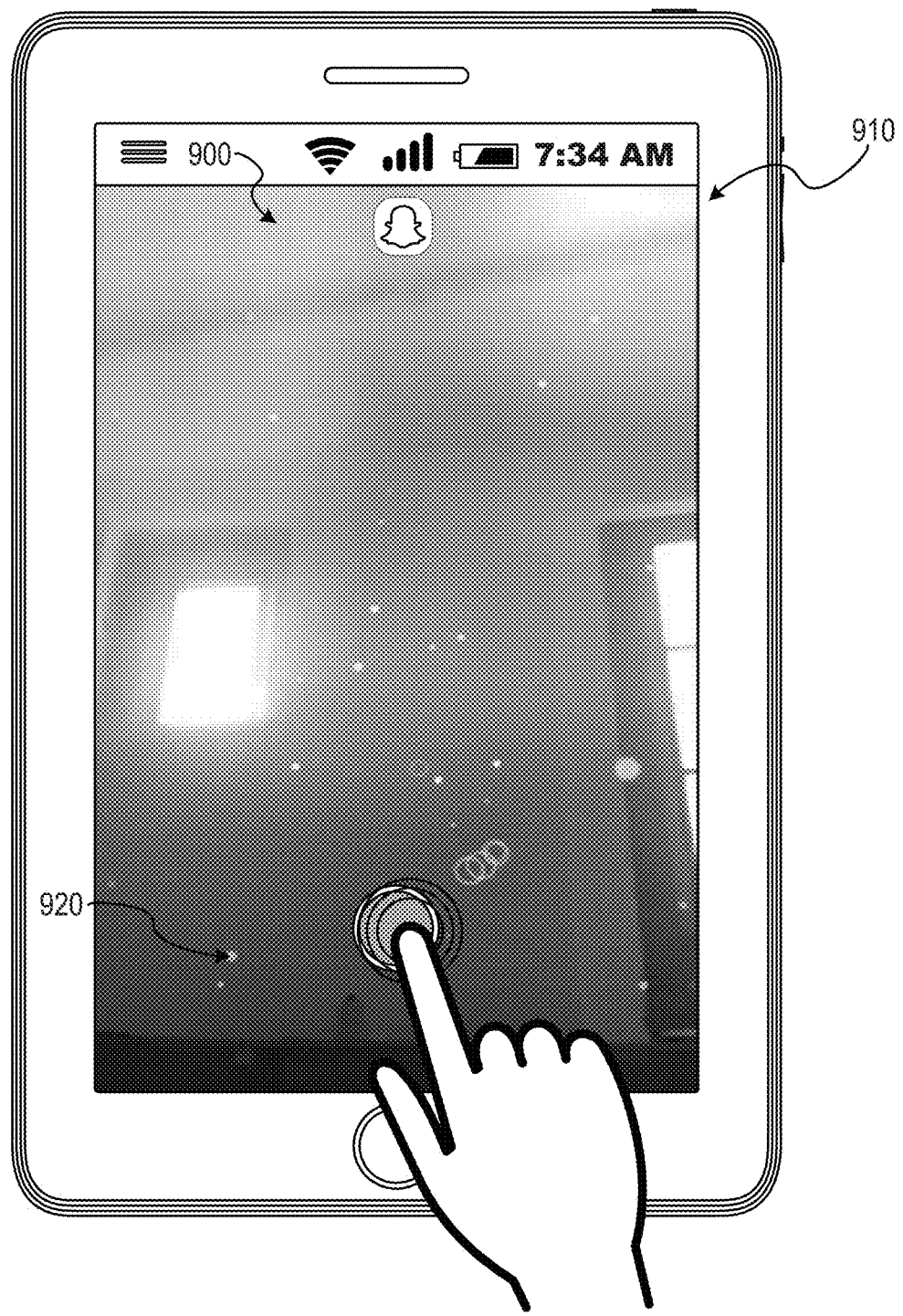
FIG. 16 is a user interface diagram depicting the augmented reality system in operation, according to some example embodiments.

In some embodiments, as part of or in conjunction with operation 360 of method 300, in operation 830, the modification component 260 modifies one or more visual characteristic of the graphical interface element according to the set of first behaviors. In some instances, the modification of the one or more visual characteristic is performed based on the change in the audio data corresponding to the set of first behaviors. For example, a change in volume or frequency of the audio data may cause the components of the augmented reality system 160 to modify the first graphical element (e.g., the aurora) to change opacity value, color value, intensity value, or position value between the first state and the second state. As shown in FIG. 9, a set of graphical elements 900 including a first graphical element 910 and a set of second graphical elements 920 may be presented within the frames of the video stream based on a current frequency, volume, or other audio characteristic in a first state. As shown in FIG. 10, the first graphical element 910 and the set of second graphical elements 920 may be modified based on changes in the audio characteristic (e.g., frequency or volume). Where the visual aspect is a regional value, regions shown by dotted lines in FIG. 9 may change to regional divisions shown in FIG. 10. Where the visual aspect is a color value, the modification of the graphical element 910, in FIG. 9, may be a change from blue (e.g., the first state), as shown in FIG. 15, at a first volume level (e.g., a decibel level) to red (e.g., the second state) at a second volume level, as shown in FIG. 16, shown in FIG. 10. In this example, the change between the first state and the second state may be a binary change with no intermediate color values or a gradual change cycling through one or more intermediate color values between blue and red.

The set of second behaviors may be similar to the set of first behaviors, such that a change in the audio data causes a modification in an action, visual aspect, or other aspect of at least one of the set of second graphical elements. In some embodiments, the one or more visual characteristic of the first graphical interface element is selected from a group consisting of a color value, an opacity value, a brightness value, and a position for the first graphical interface element.

In operation 840, the modification component 260 modifies one or more visual characteristic of one or more second graphical interface elements of the set of second graphical interface elements. In some embodiments, modification of the visual characteristics of one or more second graphical interface elements is performed according to the set of second behaviors and based on the change in the audio data. For example, where the set of second graphical elements are particles distributed within the aurora, the modification of the one or more second graphical elements may include moving the one or more graphical elements along a path determined by the set of second behaviors. The set of second behaviors may include a path description, a speed of movement, or any other suitable aspect relating to the position and movement of the one or more second graphical elements.

In operation 850, the presentation component 280 causes presentation of the modified first graphical interface element and the modified one or more second graphical interface elements within the second portion of the video streams.

Figure 11:
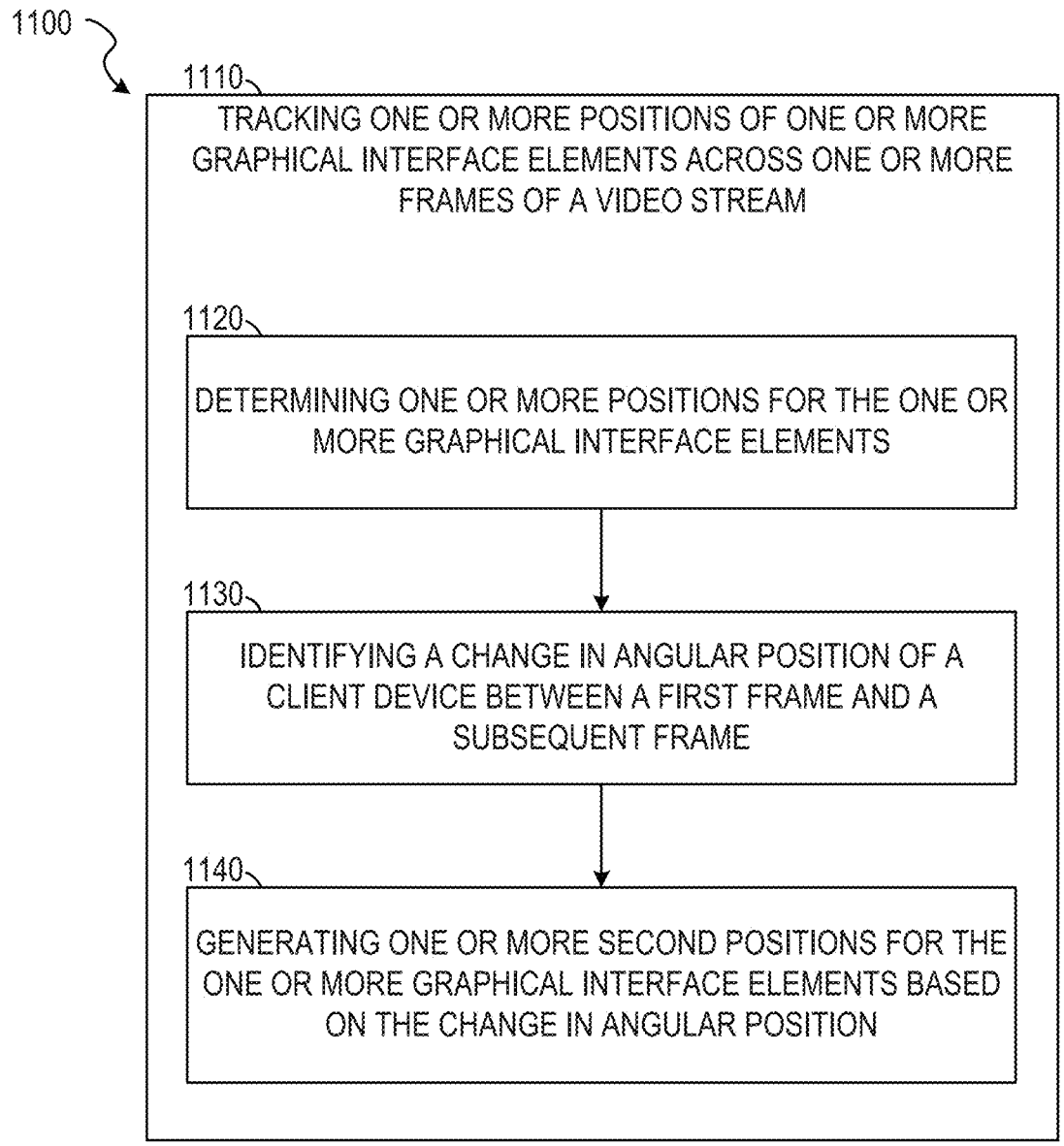
FIG. 11 a flow diagram illustrating an example method for generating responsive augmented reality elements within a graphical user interface, according to some example embodiments.

FIG. 11 depicts a flow diagram illustrating an example method 1100 for generating responsive augmented reality elements within a graphical user interface, according to some example embodiments. The operations of method 1100 may be performed by components of the augmented reality system 160. In some instances, certain operations of the method 1100 may be performed using one or more operations of one or more of the methods 300, 700, or 800 or as sub-operations of one or more operations of one or more of the methods 300, 700, or 800, as will be explained below in more detail.

In operation 1110, the tracking component tracks one or more positions of the one or more graphical interface elements across the one or more frames of the video stream. In some embodiments, operation 1110 is performed using one or more sub-operations, as described in more detail below.

In operation 1120, the tracking component 270 determines one or more positions for the one or more graphical interface elements. The positions may be determined with respect to the set of coordinates determined for an area, such as coordinates determined in a first frame of the video stream.

In operation 1130, the tracking component 270 identifies a change in angular position of the client device between the first frame and a subsequent frame. For example, where the client device 110 is rotated to a different horizontal angular position, the components of the augmented reality system 160 may track movement of the set of coordinates to generate the graphical elements at the same coordinates as the graphical elements occupied in one or more previous frames.

In operation 1140, the generation component 240 generates one or more second positions for the one or more graphical interface elements with respect to the set of coordinates and based on the change in angular position of the client device. The generation component 240 may also generate the graphical elements in positions in the sky which remain relatively or largely constant relative to the world when the client device 110 turns. Where the client device 110 is moved to a position where coordinates within the video stream are not included in those associated with graphical elements, the augmented reality system 160 may cease presentation of one or more of the graphical elements. For example, the aurora may no longer be presented by one or more particles may on occasion appear within the video stream.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 12:
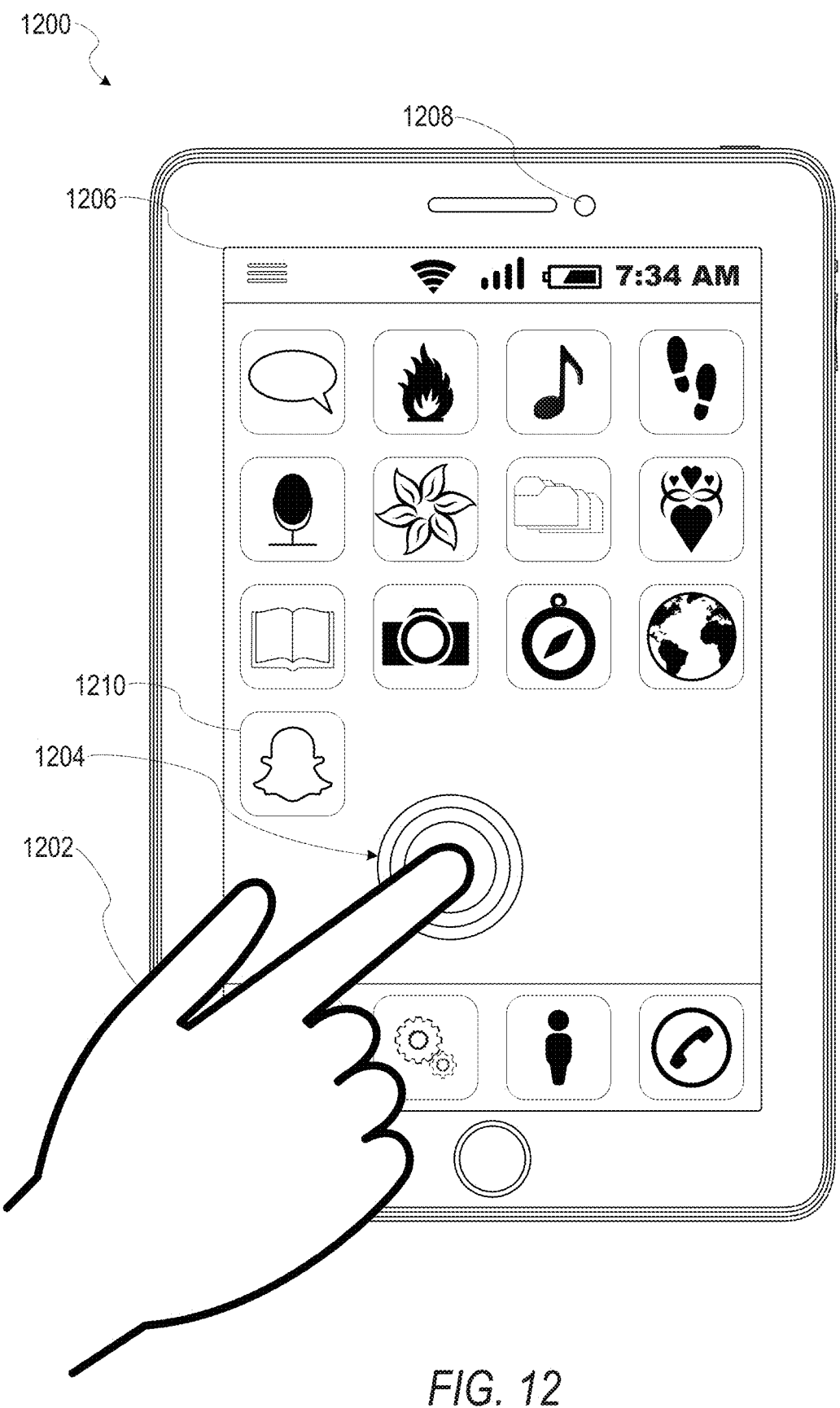
FIG. 12 is a user interface diagram depicting an example mobile device and mobile operating system interface, according to some example embodiments.

FIG. 12 illustrates an example mobile device 1200 executing a mobile operating system (e.g., IOS™, ANDROID™, WINDOWS® Phone, or other mobile operating systems), consistent with some embodiments. In one embodiment, the mobile device 1200 includes a touch screen operable to receive tactile data from a user 1202. For instance, the user 1202 may physically touch 1204 the mobile device 1200, and in response to the touch 1204, the mobile device 1200 may determine tactile data such as touch location, touch force, or gesture motion. In various example embodiments, the mobile device 1200 displays a home screen 1206 (e.g., Springboard on IOS™) operable to launch applications or otherwise manage various aspects of the mobile device 1200. In some example embodiments, the home screen 1206 provides status information such as battery life, connectivity, or other hardware statuses. The user 1202 can activate user interface elements by touching an area occupied by a respective user interface element. In this manner, the user 1202 interacts with the applications of the mobile device 1200. For example, touching the area occupied by a particular icon included in the home screen 1206 causes launching of an application corresponding to the particular icon.

The mobile device 1200, as shown in FIG. 12, includes an imaging device 1208. The imaging device may be a camera or any other device coupled to the mobile device 1200 capable of capturing a video stream or one or more successive images. The imaging device 1208 may be triggered by the augmented reality system 160 or a selectable user interface element to initiate capture of a video stream or succession of frames and pass the video stream or succession of images to the augmented reality system 160 for processing according to the one or more methods described in the present disclosure.

Many varieties of applications (also referred to as "apps") can be executing on the mobile device 1200, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1200 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1200 includes a social messaging app 1210 such as SNAPCHAT® that, consistent with some embodiments, allows users to exchange ephemeral messages that include media content. In this example, the social messaging app 1210 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the augmented reality system 160 may identify, track, extract, and generate representations of a face within the ephemeral video clip, as the ephemeral video clip is being captured by the device and transmit the ephemeral video clip to another device using the ephemeral message system.

Software Architecture

Figure 13:
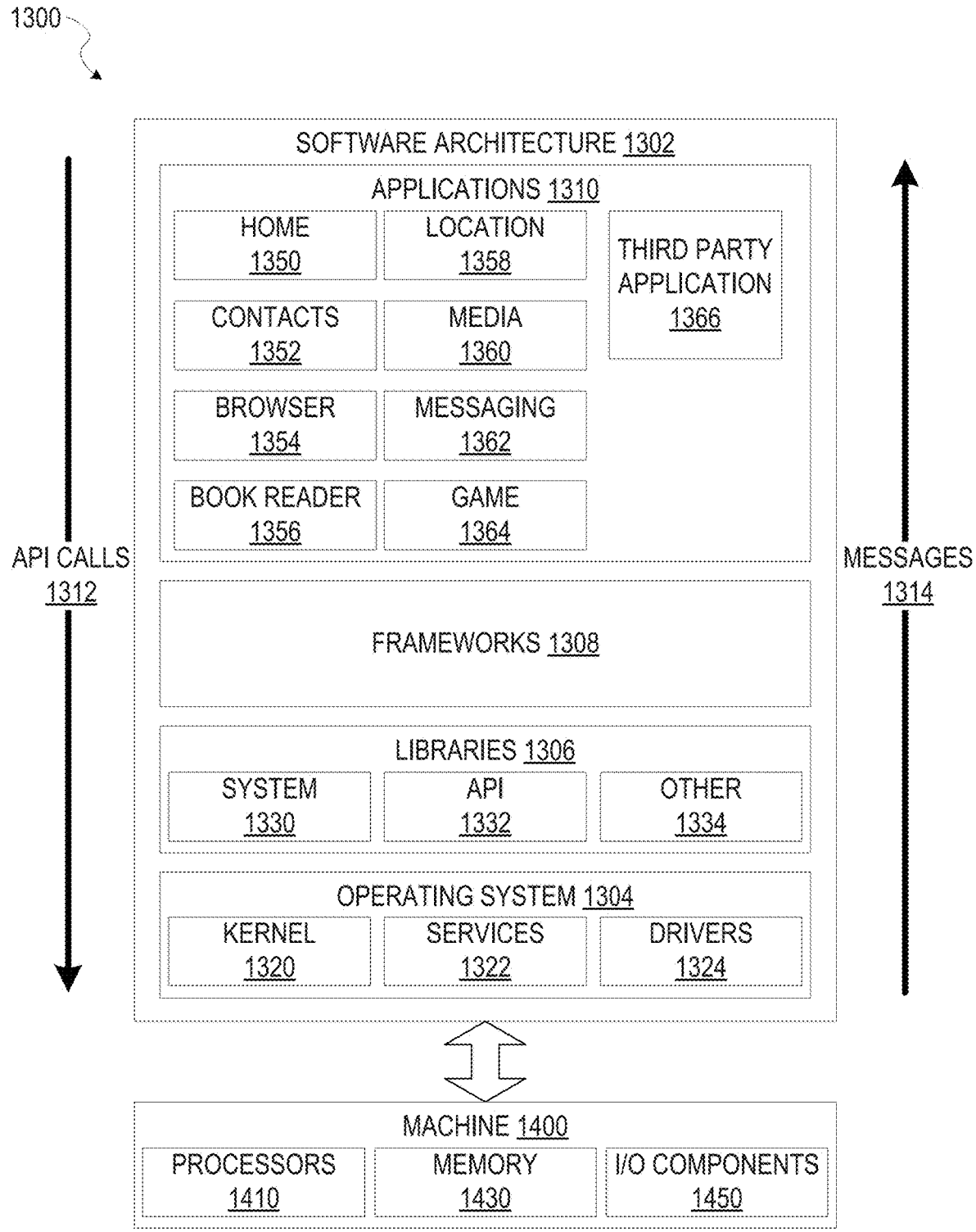
FIG. 13 is a block diagram illustrating an example of a software architecture that may be installed on a machine, according to some example embodiments.

FIG. 13 is a block diagram 1300 illustrating an architecture of software 1302, which can be installed on the devices described above. FIG. 13 is merely a non-limiting example of a software architecture, and it will be appreciated that many other architectures can be implemented to facilitate the functionality described herein. In various embodiments, the software 1302 is implemented by hardware such as machine a 1400 of FIG. 14 that includes processors 1410, memory 1430, and I/O components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third party application 1366. According to some embodiments, the applications 1310 are programs that execute functions defined in the programs. Various programming languages can be employed to create the applications 1310, structured in a variety of manners, such as object-oriented programming languages (e.g., Objective-C, Java, or C++) or procedural programming languages (e.g., C or assembly language). In a specific example, the third party application 1366 (e.g., an application developed using the ANDROID™ or IOS™ software development kit (SDK) by an entity other than the vendor of the particular platform) may be mobile software running on a mobile operating system such as IOS™ ANDROID™, WINDOWS® PHONE, or another mobile operating systems. In this example, the third party application 1366 can invoke the API calls 1312 provided by the operating system 1304 to facilitate functionality described herein.

Example Machine Architecture and Machine-Readable Medium

Figure 14:
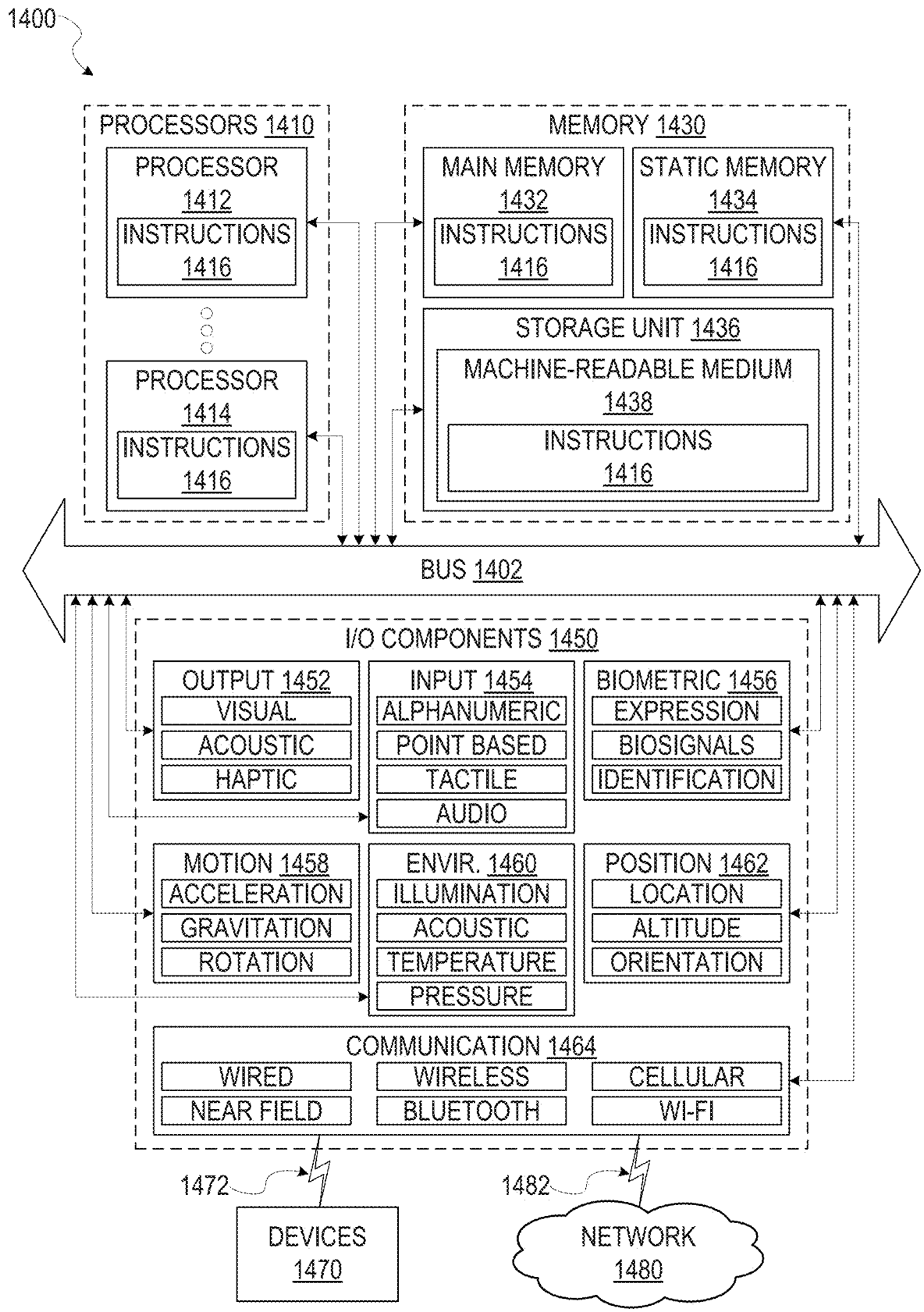
FIG. 14 is a block diagram presenting a diagrammatic representation of a machine in the form of a computer system within which a set of instructions may be executed for causing the machine to perform any of the methodologies discussed herein, according to an example embodiment.

FIG. 14 is a block diagram illustrating components of a machine 1400, according to some embodiments, able to read instructions (e.g., processor executable instructions) from a machine-readable medium (e.g., a non-transitory processor-readable storage medium or processor-readable storage device) and perform any of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any of the methodologies discussed herein can be executed. In alternative embodiments, the machine 1400 operates as a standalone device or can be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1412 and a processor 1414 that may execute the instructions 1416. The term "processor" is intended to include multi-core processors that may comprise two or more independent processors (also referred to as "cores") that can execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown in an example embodiment to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by processors of the machine 1400 (e.g., processors 1410), cause the machine 1400 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1470 may be another machine or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph. MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FIT network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals) in that it does not embody a propagating signal. However, labeling the machine-readable medium 1438 "non-transitory" should not be construed to mean that the medium is incapable of movement; the medium should be considered as being transportable from one physical location to another. Additionally, since the machine-readable medium 1438 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
receiving, by one or more processors, audio data;
identifying one or more graphical interface elements that correspond to the audio data;
in response to identifying the one or more graphical interface elements, adding the one or more graphical interface elements to a first frame of a video comprising the audio data to modify the first frame of the video to include the identified one or more graphical interface elements;
generating a display of the identified one or more graphical interface elements over visual content depicted in the video comprising the audio data to modify the video to include the identified one or more graphical interface elements, wherein a first portion of the one or more graphical interface elements is persistently displayed, and wherein a second portion of the one or more graphical interface elements is temporarily displayed for a predetermined period of time together with the first portion of the one or more graphical interface elements;
moving the second portion of the one or more graphical interface elements along a path at a specified speed of movement, the moving comprising moving the second portion of the one or more graphical interface elements that have been added to the first frame to a new position in a second frame of the video determined based on the path and the speed of movement to modify the second frame of the video; and
at expiry of the predetermined period of time, ceasing display of the second portion while maintaining display of the first portion.

2. The method of claim 1, further comprising:
detecting one or more audio characteristics within the audio data of a video stream, wherein the one or more graphical interface elements are identified based on the detected one or more audio characteristics.

3. The method of claim 1, wherein the identified one or more graphical interface elements are generated for display while one or more audio characteristics continue to be detected within the audio data associated with multiple frames of a video stream, and wherein the one or more graphical interface elements are displayed in a first portion of the video stream.

4. The method of claim 1, further comprising:
detecting a change in the audio data within a video stream; and
in response to detecting the change in the audio data, modifying the one or more graphical interface elements displayed in a subsequent portion of the video stream by gradually changing a visual attribute of at least one of the one or more graphical interface elements from a first visual attribute to a second visual attribute.

5. The method of claim 1, wherein one or more audio characteristics detected within the audio data include volume or frequency, and wherein the second portion of the one or more graphical interface elements fade into view above a person depicted within a video stream that includes the audio data.

6. The method of claim 1, wherein the one or more graphical interface elements are generated for display in a first color, further comprising modifying the one or more graphical interface elements by gradually changing a color of at least one of the one or more graphical interface elements from the first color to a second color in response to detecting a change in volume or frequency of the audio data.

7. The method of claim 1 further comprising:
generating a first graphical interface element, the first graphical interface element being generated with a set of first behaviors associated with a first audio characteristic; and
generating a set of second graphical interface elements, the set of second graphical interface elements being generated with a set of second behaviors associated with a second audio characteristic.

8. The method of claim 1 further comprising:
determining one or more positions for the one or more graphical interface elements with respect to a set of coordinates in the first frame of a video stream;
identifying a change in angular position of a client device between the first frame and a subsequent frame; and
generating one or more second positions for the one or more graphical interface elements with respect to the set of coordinates based on the change in angular position of the client device.

9. The method of claim 1 further comprising:
tracking one or more positions of the one or more graphical interface elements across one or more frames of a video stream.

10. The method of claim 1, further comprising:
detecting a change in orientation of a client device from which the audio data is received;
determining that a user input has been performed on the client device for a threshold period of time; and
in response to detecting the change in orientation and determining that the user input has been performed for the threshold period of time, initiating generation of the display of the identified one or more graphical interface elements.

11. The method of claim 10, wherein the user input comprises a press and hold operation on a touchscreen of the client device, and wherein the change in orientation comprises moving the client device to point towards a sky.

12. A device comprising:
one or more processors; and
computer readable storage medium comprising instructions that, when executed by the one or more processors of a device, cause the one or more processors to perform operations comprising:

receiving audio data;

identifying one or more graphical interface elements that correspond to the audio data;

in response to identifying the one or more graphical interface elements, adding the one or more graphical interface elements to a first frame of a video comprising the audio data to modify the first frame of the video to include the identified one or more graphical interface elements;

generating a display of the identified one or more graphical interface elements over visual content depicted in the video comprising the audio data to modify the video to include the identified one or more graphical interface elements, wherein a first portion of the one or more graphical interface elements is persistently displayed, and wherein a second portion of the one or more graphical interface elements is temporarily displayed for a predetermined period of time together with the first portion of the one or more graphical interface elements;

moving the second portion of the one or more graphical interface elements along a path at a specified speed of movement, the moving comprising moving the second portion of the one or more graphical interface elements that have been added to the first frame to a new position in a second frame of the video determined based on the path and the soeed of movement to modify the second frame of the video; and at expiry of the predetermined period of time, ceasing display of the second portion while maintaining display of the first portion.

13. The device of claim 12, wherein one or more audio characteristics detected within the audio data include volume or frequency, and wherein the second portion of the one or more graphical interface elements fade into view above a person depicted within a video stream that includes the audio data.

14. The device of claim 12, wherein the one or more graphical interface elements are generated for display in a first color, and wherein the operations further comprise modifying the one or more graphical interface elements by gradually changing a color of at least one of the one or more graphical interface elements from the first color to a second color in response to detecting a change in a volume or frequency in the audio data.

15. The device of claim 12, wherein the operations further comprise:

generating a first graphical interface element, the first graphical interface element being generated with a set of first behaviors associated with a first audio characteristic; and generating a set of second graphical interface elements, the set of second graphical interface elements being generated with a set of second behaviors associated with a second audio characteristic.

16. The device of claim 12, wherein the operations further comprise:

determining one or more positions for the one or more graphical interface elements with respect to a set of coordinates in the first frame of a video stream;

identifying a change in angular position of a client device between the first frame and a subsequent frame; and generating one or more second positions for the one or more graphical interface elements with respect to the set of coordinates based on the change in angular position of the client device.

17. The device of claim 12, wherein the operations further comprise tracking one or more positions of the one or more graphical interface elements across one or more frames of a video stream.

18. A non-transitory computer readable storage medium comprising non-transitory instructions that, when executed by one or more processors of a device, cause the device to perform operations comprising:

receiving audio data;

identifying one or more graphical interface elements that correspond to the audio data;

in response to identifying the one or more graphical interface elements, adding the one or more graphical interface elements to a first frame of a video comprising the audio data to modify the first frame of the video to include the identified one or more graphical interface elements;

generating a display of the identified one or more graphical interface elements over visual content depicted in the video comprising the audio data to modify the video to include the identified one or more graphical interface elements, wherein a first portion of the one or more graphical interface elements is persistently displayed, and wherein a second portion of the one or more graphical interface elements is temporarily displayed for a predetermined period of time together with the first portion of the one or more graphical interface elements;

moving the second portion of the one or more graphical interface elements along a path at a specified speed of movement, the moving comprising moving the second portion of the one or more graphical interface elements that have been added to the first frame to a new position in a second frame of the video determined based on the path and the speed of movement to modify the second frame of the video; and at expiry of the predetermined period of time, ceasing display of the second portion while maintaining display of the first portion.

19. The non-transitory computer readable storage medium of claim 18, wherein the one or more graphical interface elements are generated for display with a first visual attribute, and wherein the operations further comprise:

modifying the one or more graphical interface elements by gradually changing a visual attribute of at least one of the one or more graphical interface elements from the first visual attribute to a second visual attribute in response to detecting a change in the audio data.

* * * * *

UNITED STATES PATENT AND TRADEMARK OFFICE
CERTIFICATE OF CORRECTION

PATENT NO. : 10,878,635 B1
APPLICATION NO. : 16/528273
DATED : December 29, 2020
INVENTOR(S) : Charlton et al.

Page 1 of 1

It is certified that error appears in the above-identified patent and that said Letters Patent is hereby corrected as shown below:

In the Claims

In Column 25, Line 30, in Claim 12, delete "soeed" and insert --speed-- therefor Signed and Sealed this
Seventh Day of December, 2021

Drew Hirshfeld
*Performing the Functions and Duties of the
Under Secretary of Commerce for Intellectual Property and
Director of the United States Patent and Trademark Office*